United States Patent
Kaneshima et al.

(10) Patent No.: US 9,908,961 B2
(45) Date of Patent: Mar. 6, 2018

(54) VINYL ALCOHOL-BASED GRAFT POLYMER, METHOD FOR PRODUCING SAME, AND ION-EXCHANGE MEMBRANE USING SAME

(71) Applicant: KURARAY CO., LTD., Kurashiki-shi (JP)

(72) Inventors: Takuma Kaneshima, Kurashiki (JP); Yusuke Amano, Kurashiki (JP); Keisuke Morikawa, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 19 days.

(21) Appl. No.: 14/728,279

(22) Filed: Jun. 2, 2015

(65) Prior Publication Data
US 2015/0259457 A1 Sep. 17, 2015

Related U.S. Application Data

(63) Continuation of application No. PCT/JP2013/082410, filed on Dec. 3, 2013.

(30) Foreign Application Priority Data

Dec. 4, 2012 (JP) .................................. 2012-265257
Mar. 5, 2013 (JP) .................................. 2013-042488

(51) Int. Cl.
*C08F 265/04* (2006.01)
*B01J 39/20* (2006.01)
(Continued)

(52) U.S. Cl.
CPC ............ *C08F 265/04* (2013.01); *B01D 71/38* (2013.01); *B01D 71/78* (2013.01); *B01D 71/82* (2013.01);
(Continued)

(58) Field of Classification Search
USPC .............................................. 521/27; 526/214
See application file for complete search history.

(56) References Cited

U.S. PATENT DOCUMENTS

| | | | |
|---|---|---|---|
| 3,632,826 A | | 1/1972 | Berger |
| 4,565,854 A | * | 1/1986 | Sato .......................... C08F 2/38 |
| | | | 526/214 |

(Continued)

FOREIGN PATENT DOCUMENTS

| | | |
|---|---|---|
| CN | 101278007 A | 10/2008 |
| CN | 102449042 A | 5/2012 |

(Continued)

OTHER PUBLICATIONS

Combined Office Action and Search Report dated Jul. 1, 2016 in Chinese Patent Application No. 201380063406.8 (with English translation of Search Report).

(Continued)

*Primary Examiner* — Mark Kaucher
*Assistant Examiner* — Henry Hu
(74) *Attorney, Agent, or Firm* — Oblon, McClelland, Maier & Neustadt, L.L.P.

(57) ABSTRACT

Provided are (1) a vinyl alcohol graft copolymer grafting polymerizable unsaturated monomers as a graft chain onto a side-chain mercapto group-containing vinyl alcohol polymer backbone, the graft chain being attached to the polymer backbone at a mercapto group, and the backbone including: a vinyl alcohol unit and a unit represented by the following formula (I):

(Continued)

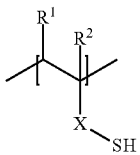

(I)

wherein $R^1$ is a hydrogen atom or a carboxyl group; $R^2$ is a hydrogen atom, a methyl group, a carboxyl group, or a carboxymethyl group; and X is a divalent $C_{1-22}$ group which contains a carbon atom and a hydrogen atom and may contain a nitrogen atom and/or an oxygen atom; and (2) an ion-exchange membrane having controlled swelling in water and excellent flex resistance, the membrane including a vinyl alcohol graft copolymer as described above.

15 Claims, 1 Drawing Sheet

(51) Int. Cl.
| | |
|---|---|
| B01J 47/12 | (2017.01) |
| B01D 71/38 | (2006.01) |
| B01D 71/78 | (2006.01) |
| B01D 71/82 | (2006.01) |
| C08F 2/38 | (2006.01) |
| C08F 261/04 | (2006.01) |
| B01J 41/14 | (2006.01) |

(52) U.S. Cl.
CPC ............... *B01J 39/20* (2013.01); *B01J 41/14* (2013.01); *B01J 47/12* (2013.01); *C08F 2/38* (2013.01); *C08F 261/04* (2013.01); *B01D 2323/38* (2013.01)

(56) References Cited

U.S. PATENT DOCUMENTS

| | | | | |
|---|---|---|---|---|
| 4,824,904 A * | 4/1989 | Aoyama | ................. | C08L 29/04 428/520 |
| 6,440,429 B1 * | 8/2002 | Torizuka | ................. | A61K 8/06 424/401 |
| 8,097,345 B2 | 1/2012 | Hakamata et al. | | |
| 8,101,668 B2 * | 1/2012 | Takagi | ................. | C08F 261/00 521/27 |
| 8,716,358 B2 | 5/2014 | Jikihara et al. | | |
| 9,266,069 B2 | 2/2016 | Higa et al. | | |
| 2005/0053792 A1 * | 3/2005 | Toyoshima | ............... | C08F 8/28 428/426 |
| 2008/0176966 A1 | 7/2008 | Takagi et al. | | |
| 2009/0269592 A1 | 10/2009 | Hakamata et al. | | |
| 2012/0031834 A1 | 2/2012 | Higa et al. | | |
| 2012/0035280 A1 | 2/2012 | Jikihara et al. | | |
| 2012/0312688 A1 | 12/2012 | Berthelot et al. | | |
| 2014/0350169 A1 * | 11/2014 | Kaneshima | ............ | D21H 21/16 524/547 |

FOREIGN PATENT DOCUMENTS

| | | |
|---|---|---|
| CN | 102458618 A | 5/2012 |
| JP | 59-187005 | * 10/1984 |
| JP | 59-189113 | 10/1984 |
| JP | 06-016738 | * 1/1994 |
| JP | 6-16738 | 1/1994 |
| JP | 9-136924 | 5/1997 |
| JP | 2006-291161 | 10/2006 |
| JP | 2011-162637 | 8/2011 |
| WO | WO 2010/119858 | 10/2010 |
| WO | WO 2011-073363 | 6/2011 |
| WO | WO 2013/105188 | 7/2013 |

OTHER PUBLICATIONS

International Search Report dated Mar. 11, 2014 in PCT/JP2013/082410 filed Dec. 3, 2013.

Extended Search Report dated Jun. 16, 2016 in European Patent Application No. 13860548.0.

Notification of Reason(s) for Rejection dated Oct. 18, 2016 in Japanese Patent Application No. 2014-551097 (with English Summary).

Office Action dated Feb. 3, 2017 in Chinese Patent Application No. 201380063406.8.

* cited by examiner

VINYL ALCOHOL-BASED GRAFT POLYMER, METHOD FOR PRODUCING SAME, AND ION-EXCHANGE MEMBRANE USING SAME

CROSS REFERENCE TO THE RELATED APPLICATION

This application is a continuation application, under 35 U.S.C. § 111(a), of international application No. PCT/JP2013/082410, filed on Dec. 3, 2013, which claims priority to Japanese Patent Application No. 2012-265257, filed on Dec. 4, 2012, and Japanese Patent Application No. 2013-042488, filed on Mar. 5, 2013, the entire disclosures of each of which are herein incorporated by reference as a part of this application.

FIELD OF THE INVENTION

The present invention relates to a vinyl alcohol graft copolymer grafting a graft attached to a backbone at a controlled starting point, to a method for producing the same, and to an ion-exchange membrane using the same.

BACKGROUND ART

Vinyl alcohol polymers (hereinafter vinyl alcohol polymer is sometimes abbreviated as PVA) are one of the few water-soluble and crystalline polymers, and have excellent interfacial and strength properties. PVAs have been used for paper processing, for textile processing, and also as emulsion stabilizers. PVAs also hold an important position as PVA films, PVA fibers, and others.

Block copolymers and graft copolymers comprising chemically bonded polymer units each having different properties show various physical characteristics depending on diverse combination of polymer units. In addition to applications for impact resistant resins, polymeric emulsifiers and dispersing agents, the block copolymers and graft copolymers have attracted attention as film materials and medical materials in recent years, leading to varieties of study cases. Block copolymers comprising a PVA as one of the structural units as well as graft copolymers comprising a PVA as a backbone (trunk polymer) have been expected as new materials having new properties while retaining the properties originated from the PVAs.

Hitherto a block copolymer comprising a PVA as a structural unit has been proposed (Patent Document 1).

Further, some graft copolymers comprising PVAs as backbone have also been proposed (Patent Documents 2 and 3). For example, Patent Document 2 discloses a graft polymer comprising a polyvinyl alcohol (PVA) unit as a main chain and a polymer unit of polymerized sulfonic acid group-containing monomers as a graft chain. This document describes that the graft polymer can be obtained by graft polymerization (or graft reaction) in the presence of a catalyst or an initiator.

Patent Document 3 discloses a method of grafting vinyl monomers on a polyvinyl alcohol comprising: allowing hydroxyl groups as side chains of the polyvinyl alcohol to be reacted with a thiol group-containing silane coupling agent to introduce the thiol groups into the polyvinyl alcohol, subsequently allowing the introduced thiol groups to be reacted with persulfate ions to generate radicals on the polyvinyl alcohol, and allowing the radicals as reacting points to be reacted with the vinyl monomers.

Meanwhile, ion exchange membranes have been used in electrodialysis methods or diffusion dialysis methods for a wide variety of applications such as seawater concentration, removal of salts or nitrate nitrogen from underground brine or brackish water for making drinking water, removal of salts in food production, concentration of active ingredients for medical pharmaceutical product, and others As ion-exchange membranes useful for the above applications, an ion exchange membrane is disclosed which comprises a support layer and an ion-exchange layer formed on the support layer, the ion-exchange layer comprising a block copolymer comprising a polyvinyl alcohol unit and an anionic or cationic polymer unit (Patent Document 4).

RELATED ART DOCUMENTS

Patent Documents

[Patent Document 1] JP Laid-open Patent Publication No. 59-189113
[Patent Document 2] JP Laid-open Patent Publication No. 2006-291161
[Patent Document 3] JP Laid-open Patent Publication No. 06-016738
[Patent Document 4] International Publication No. WO2010/119858 A1

SUMMARY OF THE INVENTION

Problems to be Solved by the Invention

However, the block copolymer obtained in Patent Document 1 has a problem that production of the block copolymer also produces a large amount of homopolymers, resulting in deteriorated flex resistance of the film to be formed from the block copolymer.

The production method of Patent Document 2 cannot control the obtained products in a sufficient way because the production method allows heavy metal-based polymerization initiators remained after the synthesis of the graft copolymers and produces not only graft copolymers but also block copolymers. In Patent Document 3 since the silane coupling agent reacts with the PVA at multiple points, if the reaction points for graft polymerization are increased, there is a high possibility that the resultant becomes a gel-like material. In contrast, in order to avoid generation of the gel-like material, there is a limit in the amount of reaction points as starting points for graft reactions as well as the amount of introduced graft chains. Further, since this document only implements introduction into fiber forms of PVA, the possibility of application to other PVA forms is not disclosed.

In Patent Document 4, since the obtained ion-exchange membrane is formed from a block copolymer containing a polyvinyl alcohol unit and an anionic or cationic polymer unit, the obtained film has problems such as low flex resistance and too much swelling in water.

Accordingly, an object of an embodiment of the present invention is to provide a graft copolymer having excellent flex resistance, the graft copolymer grafting a graft attached to a side-chain mercapto group-containing vinyl alcohol polymer as a backbone, the side-chain mercapto group-containing vinyl alcohol polymer being capable of controlling a starting point for graft polymerization.

Another object of an embodiment of the present invention is to provide a graft copolymer having a high graft ratio and being shapable or moldable by using a solution of the graft copolymer dissolved in a solvent such as water.

A still another object of an embodiment of the present invention is to provide an ion-exchange membrane formed from a graft copolymer comprising an ionic group introduced as a graft.

A yet another object of an embodiment of the present invention is to provide a single layer ion-exchange membrane being self-supportable without a support layer.

A yet further object of the present invention is to provide an ion-exchange membrane having a controlled swelling in water even having a high content of ionic groups.

Means for Solving the Problems

The inventors of the present invention made an intensive study to achieve the above object and have found that graft polymerization can be controlled in an unconventional way by using a side-chain mercapto group-containing vinyl alcohol polymer because a mercapto group already present in the polymer can be used as a starting point for graft polymerization, thereby completing the present invention.

A first aspect of the present invention is a vinyl alcohol graft copolymer grafting polymerizable unsaturated monomers as a graft chain onto a side-chain mercapto group-containing vinyl alcohol polymer backbone, the graft chain being attached to the polymer backbone at a mercapto group, and the side-chain mercapto group-containing vinyl alcohol polymer backbone comprising:
a vinyl alcohol structural unit, and
a structural unit represented by the following formula (I):

[Chem. 1]

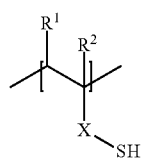

(I)

Wherein $R^1$ is a hydrogen atom or carboxyl group; $R^2$ is a hydrogen atom, a methyl group, a carboxyl group, or a carboxymethyl group; and X is a divalent $C_{1-22}$ group which contains a carbon atom and a hydrogen atom and may contain a nitrogen atom and/or an oxygen atom. Where $R^1$ is a carboxyl group, the carboxyl group may form a ring with a hydroxyl group of an adjacent vinyl alcohol unit. Where $R^2$ is a carboxyl group or a carboxymethyl group, the carboxyl group or the carboxymethyl group may form a ring with a hydroxyl group of an adjacent vinyl alcohol unit.

In the vinyl alcohol graft copolymer, X may be preferably a divalent $C_{1-22}$ linear or branched aliphatic group which may contain at least one species selected from the group consisting of a carbonyl bond (—CO—), an ether bond (—O—), an amino bond [—NR— (R is a hydrogen atom or a group containing a carbon atom bonding to the nitrogen atom "N")], an amide bond (—CONH—), an alkoxy group, a carboxyl group (—COOH), and a hydroxyl group (—OH) to form a vinyl alcohol graft copolymer.

In the vinyl alcohol graft copolymer, X may be preferably a divalent group represented by a formula *—CO—NH—$X^1$— (wherein * is a bond attached to a main chain of the polymer; and $X^1$ is a divalent $C_{1-20}$ aliphatic hydrocarbon group which may contain a nitrogen atom and/or an oxygen atom).

In the vinyl alcohol graft copolymer, the polymerizable unsaturated monomer to be grafted may be soluble to water.

In the vinyl alcohol graft copolymer, the polymerizable unsaturated monomer units may have a content of 1 to 90% by mole based on the total structural units of the graft copolymer.

The vinyl alcohol graft copolymer may be a vinyl alcohol graft copolymer comprising a graft chain which comprises a cationic monomer unit or an anionic monomer unit as the structural units of the graft chain.

A second aspect of the present invention is a method for producing a vinyl alcohol graft copolymer comprising:
providing the side-chain mercapto group-containing vinyl alcohol polymer described above, and
graft-polymerizing polymerizable unsaturated monomers onto the side-chain mercapto group-containing vinyl alcohol polymer.

In the method described above, the side-chain mercapto group-containing vinyl alcohol polymer is preferably obtained by
copolymerizing vinyl ester monomers with unsaturated monomers which are copolymerizable with the vinyl ester monomers and convertible into the structural unit represented by the formula (I) to obtain a copolymer comprising a vinyl ester unit and a unit derived from the unsaturated monomer, and
converting the unit derived from the unsaturated monomer into the structural unit represented by the formula (I) by solvolysis.

A third aspect of the present invention is an ion-exchange membrane comprising the vinyl alcohol graft copolymer.

In the ion-exchange membrane described above, the content of the anionic monomer unit or the cationic monomer unit may be 1 to 90% by mole based on the total structural units of the vinyl alcohol graft copolymer.

The ion-exchange membrane described above may have a swelling degree represented by the following formula of 1.68 or less.

Swelling degree=$[W_1]/[W_2]$ (In the formula, $W_1$ represents a mass of a membrane reached to swelling equilibrium in ion-exchanged water at 25° C.; $W_2$ represents a mass of the membrane after drying the membrane used for measuring $W_1$ at 40° C. for 12 hours under vacuum.)

In the ion-exchange membrane described above, the ion-exchange capacity is preferably 0.3 mmol/g or higher.

In the ion-exchange membrane described above, a cross-linking may be preferably introduced into the vinyl alcohol graft copolymer.

The ion-exchange membrane is preferably formed of a single layer which preferably contains the polyvinyl alcohol graft copolymer.

In the ion-exchange membrane described above, the single layer comprising the vinyl alcohol graft copolymer preferably has a thickness of from 1 to 1,000 μm.

It should be noted that any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

Effect of the Invention

The vinyl alcohol graft copolymer according to the present invention can be derived from a side-chain mercapto group-containing vinyl alcohol polymer. Since the side-chain mercapto group-containing vinyl alcohol polymer comprises a structural unit having a side-chain mercapto group and a vinyl alcohol structural unit, it is possible to control the starting point for graft polymerization.

By controlling the modification amount of the side-chain mercapto group-containing vinyl alcohol polymer, it is possible, without forming a gel-like material, to increase the introduced amount of the graft chain. For this reason, it is possible to obtain a moldable graft copolymer by dissolving them in a solvent such as water even having a high graft ratio.

Such a side chain mercapto group-containing vinyl alcohol polymer makes it possible to carry out graft polymerization using a wide variety of polymerizable unsaturated monomers.

In particular, where graft polymerization is carried out with polymerizable unsaturated monomers capable of dissolving to water, it is possible to obtain an aqueous solution of a graft copolymer directly so as to give a molded or shaped article such as a film from the aqueous solution, the molded or shaped article containing a PVA as a backbone chain and being excellent in flex resistance.

According to the present invention, by using a specific side-chain mercapto group-containing vinyl alcohol polymer as a backbone, it is possible to obtain a vinyl alcohol graft copolymer having a graft chain of an ionic group-containing polymer. Thereby, it is possible to obtain an ion-exchange membrane having excellent flex resistance.

The ion-exchange membrane comprising such a vinyl alcohol graft copolymer enables not only to have an ion-exchange property, but also to control the swelling degree in water.

Further, by using such a vinyl alcohol graft copolymer, it is possible to obtain an ion-exchange membrane usable as a freestanding film without a support layer.

DESCRIPTION OF EMBODIMENTS

Figure 1:
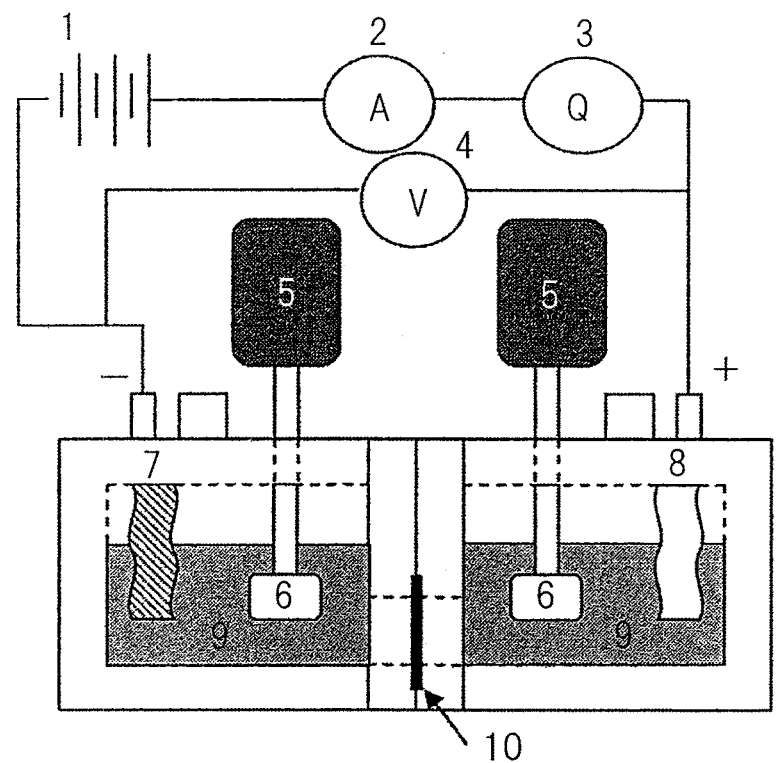
FIG. 1 is a schematic view of a testing device for measuring the dynamic transport number of the ion-exchange membrane.

The side-chain mercapto group-containing vinyl alcohol polymer as a backbone of the graft copolymer according to the present invention has a structural unit represented by the following formula (I) and is copolymerizable with a vinyl ester described below.

[Chem. 2]

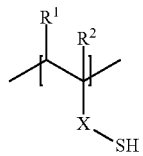

(I)

In the formula (I), $R^1$ is a hydrogen atom or a carboxyl group; $R^2$ is a hydrogen atom, a methyl group, a carboxyl group, or a carboxymethyl group; and X is a divalent $C_{1-22}$ group which contains a carbon atom and a hydrogen atom and which may contain a nitrogen atom and/or an oxygen atom. Where $R^1$ is a carboxyl group, the carboxyl group may form a ring with a hydroxyl group of an adjacent vinyl alcohol unit. Where $R^2$ is a carboxyl group or a carboxymethyl group, the carboxyl group or the carboxymethyl group may form a ring with a hydroxyl group of an adjacent vinyl alcohol unit.

The X in the unit represented as the formula (I) acts as a spacer between the polymer main chain and the mercapto group so as to improve the reactivity of the mercapto group in terms of steric factors. The spacer X is not particularly limited to a specific one as long as it is a divalent $C_{1-22}$ group which contains a carbon atom and a hydrogen atom and may contain a nitrogen atom and/or an oxygen atom. The number of carbon atoms of X may be preferably from 1 to 20. The number of hydrogen atoms, the number of oxygen atoms, and the number of nitrogen atoms contained in X are not particularly limited. Examples of X containing a nitrogen atom and/or an oxygen atom may include one containing a nitrogen atom and/or an oxygen atom inserted between carbon atoms of an aliphatic hydrocarbon group, for example, one containing a carbonyl bond (—CO—), an ether bond (—O—), an amino bond [—NR— (R is a hydrogen atom or a group containing a carbon atom bonding to the nitrogen atom "N")], or an amide bond (—CONH—); one containing a nitrogen atom and/or an oxygen atom replaced with a hydrogen atom of the aliphatic hydrocarbon group, for example, one containing an alkoxy group, a carboxyl group (—COOH), or a hydroxyl group (—OH). Examples of X may include a linear, branched or cyclic aliphatic hydrocarbon group having 1 to 22 carbon atoms (in particular, an alkylene group); a linear, branched or cyclic aliphatic hydrocarbon group having 1 to 22 carbon atoms in total (in particular, an alkylene group) which contains at least one bond selected from the group consisting of a carbonyl bond, an ether bond, an amino bond and an amide bond; a linear, branched or cyclic aliphatic hydrocarbon group having 1 to 22 carbon atoms in total (in particular, an alkylene group) which contains at least one substituent group selected from the group consisting of an alkoxy group, a carboxyl group and a hydroxyl group; a linear, branched or cyclic aliphatic hydrocarbon group having 1 to 20 carbon atoms in total (in particular, an alkylene group) which contains at least one substituent group selected from the group consisting of an alkoxy group, a carboxyl group and a hydroxyl group and at least one bond selected from the group consisting of a carbonyl bond, an ether bond and an amide bond.

In one preferred embodiment, in the formula (I), $R^1$ is a hydrogen atom; $R^2$ is a hydrogen atom or a methyl group; X is a divalent $C_{1-20}$ group which contains a carbon atom and a hydrogen atom and may contain a nitrogen atom and/or an oxygen atom. In this embodiment, from the viewpoint of availability of raw materials and facilitation of synthesis, X is preferably a linear or branched alkylene group having 1 to 20 carbon atoms in total which may be substituted with a carboxyl group or a hydroxyl group, more preferably a linear or branched alkylene group having 1 to 20 carbon atoms in total, still more preferably a linear or branched alkylene group having 2 to 14 carbon atoms in total, and further preferably a linear or branched alkylene group having 2 to 8 carbon atoms in total. In view of reactivity, X is most preferably a linear alkylene group having 6 carbon atoms.

In another preferred embodiment, in the formula (I), X contains an amide bond bonding to a main chain of the side-chain mercapto group-containing vinyl alcohol polymer directly or through one methylene group. In the embodiment, for example, the structural unit represented by the formula (I) is a structural unit of a formula (I') represented by the following formula.

[Chem. 3]

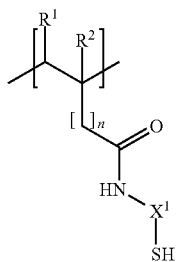

(I')

Wherein $R^1$ and $R^2$ is the same as defined above; n is 0 or 1; and $X^1$ is a divalent $C_{1-20}$ aliphatic hydrocarbon group which may contain a nitrogen atom and/or an oxygen atom.

Preferably n is 0. In such a case, X is *—CO—NH—$X^1$— (wherein * is a bond attached to a main chain of the polymer; and $X^1$ is the same as defined above). Where n is 0, it is possible to reduce the amount of unreacted monomers in the preparation of side-chain mercapto group-containing vinyl alcohol polymer so as to reduce the influence by the unreacted monomers.

The aliphatic hydrocarbon group represented by $X^1$ is any of linear, branched, or cyclic, and preferably has a linear or branched structure. Where the aliphatic hydrocarbon group is a branched group branched from the main chain of the aliphatic hydrocarbon group (i.e., the chain which is inserted between the sulfur atom and the nitrogen atom), the number of carbon atoms in the branched moiety is preferably 1 to 5. Where $X^1$ contains a nitrogen atom and/or an oxygen atom, examples of $X^1$ may include one containing a nitrogen atom and/or an oxygen atom inserted between carbon atoms of the aliphatic hydrocarbon group, for example, one containing a carbonyl bond, an ether bond, an amino bond or an amide bond; one containing a nitrogen atom and/or an oxygen atom replaced with a hydrogen atom of the aliphatic hydrocarbon group, for example, one containing an alkoxy group, a carboxyl group or a hydroxyl group. From the viewpoint of availability of raw materials and facilitation of synthesis, $X^1$ is preferably a linear or branched alkylene group having 1 to 20 carbon atoms in total which may contain a carboxyl group, more preferably a linear or branched alkylene group having 2 to 15 carbon atoms in total which may contain a carboxyl group, and still more preferably a linear or branched alkylene group having 2 to 10 carbon atoms in total which may contain a carboxyl group.

Such a structural unit can be derived from an unsaturated monomer that can be converted into the structural unit represented by the formula (I), preferably from a thioester monomer having an unsaturated double bond represented by the following formula (II).

[Chem. 4]

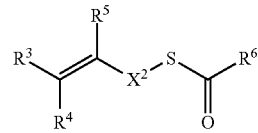

(II)

Wherein $R^3$ and $R^4$ each independently is a hydrogen atom or a carboxyl group; $R^5$ is a hydrogen atom, a methyl group, a carboxyl group or a carboxymethyl group; $X^2$ is a $C_{1-22}$ group which contains a carbon atom and a hydrogen atom and may contain a nitrogen atom and/or an oxygen atom; and $R^6$ is a methyl group or to form a cyclic structure via covalent bonding to a carbon atom that is contained in $X^2$.

Where $X^2$ comprises an amide bond in which the carbonyl carbon of the amide bond is bonded to a vinyl carbon, a thioester monomer having an unsaturated double bond represented by the formula (II) has good copolymerizability with a vinyl ester as described below so as to make it easier to control the modification amount of the side-chain mercapto group-containing vinyl alcohol polymer of the present invention as well as to increase the polymerization degree of the polymer. In general, there is a concern that usage of thioester monomers causes odor due to unreacted monomers remaining in the polymer at the polymerization end. However, in the case where $X^2$ comprises amide bond in which the carbonyl carbon of the amide bond is bonded to a vinyl carbon, the thioester monomer having an unsaturated double bond represented by the formula (II) causes unreacted monomers in an extremely reduced amount at the end of polymerization.

The thioester monomer having an unsaturated double bond represented by the formula (II) may be prepared according to known methods.

Preferred examples of the thioester monomers having an unsaturated double bond represented by the formula (II) may include, for example, thioacetic acid S-(3-methyl-3-buten-1-yl) ester, thioacetic acid S-17-octadecen-1-yl ester, thioacetic acid S-15-hexadecen-1-yl ester, thioacetic acid S-14-pentadecen-1-yl ester, thioacetic acid S-13-tetradecen-1-yl ester, thioacetic acid S-12-tridecen-1-yl ester, thioacetic acid S-11-dodecen-1-yl ester, thioacetic acid S-10-undecen-1-yl ester, thioacetic acid S-9-decen-1-yl ester, thioacetic acid S-8-nonen-1-yl ester, thioacetic acid S-7-octen-1-yl ester, thioacetic acid S-6-hepten-1-yl ester, thioacetic acid S-5-hexen-1-yl ester, thioacetic acid S-4-penten-1-yl ester, thioacetic acid S-3-buten-1-yl ester, thioacetic acid S-2-propen-1-yl ester, thioacetic acid S-[1-(2-propen-1-yl)hexyl]ester, thioacetic acid S-(2,3-dimethyl-3-buten-1-yl) ester, thioacetic acid S-(1-ethenylbutyl) ester, thioacetic acid S-(2-hydroxy-5-hexen-1-yl) ester, thioacetic acid S-(2-hydroxy-3-buten-1-yl) ester, thioacetic acid S-(1,1-dimethyl-2-propen-1-yl) ester, 2-[(acetylthio)methyl]-4-pentenoic acid, thioacetic acid S-(2-methyl-2-propen-1-yl) ester, thioesters represented by the following formulae from (a-1) to (a-30), and others.
[Chem. 5]
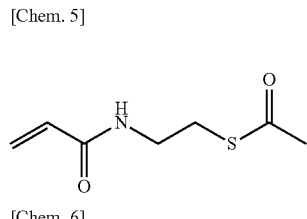
(a-1)
[Chem. 6]
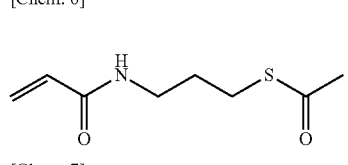
(a-2)
[Chem. 7]
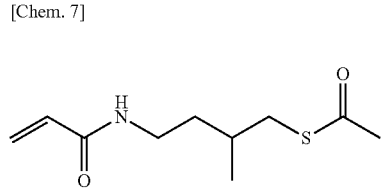
(a-3)
[Chem. 8]
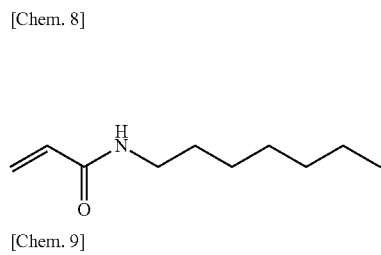
(a-4)
[Chem. 9]
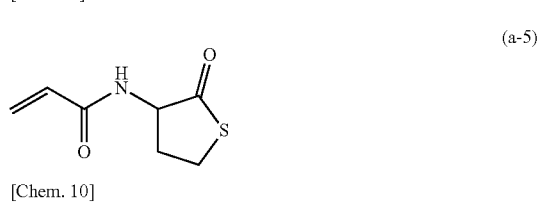
(a-5)
[Chem. 10]
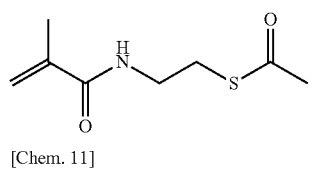
(a-6)
[Chem. 11]
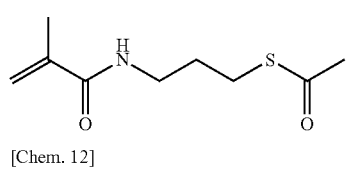
(a-7)
[Chem. 12]
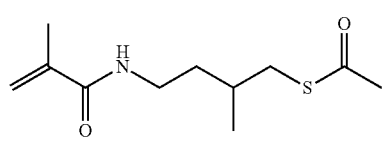
(a-8)
[Chem. 13]
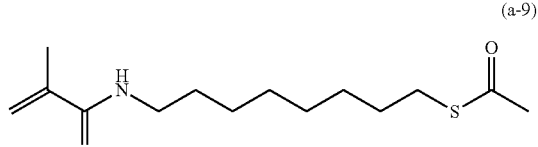
(a-9)
[Chem. 14]
(a-10)
[Chem. 15]
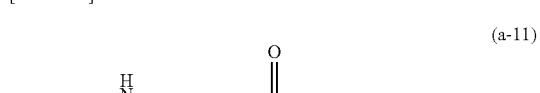
(a-11)
[Chem. 16]
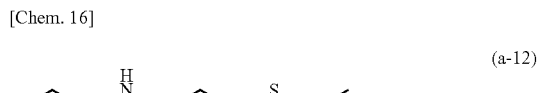
(a-12)
[Chem. 17]
(a-13)
[Chem. 18]
(a-14)
[Chem. 19]
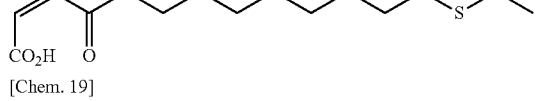
(a-15)
[Chem. 20]
(a-16)
[Chem. 21]
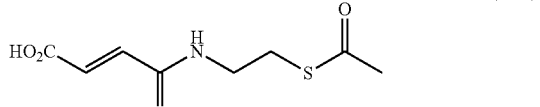
(a-17)

[Chem. 22]

(a-18)
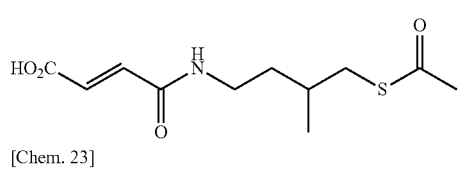

[Chem. 23]

(a-19)
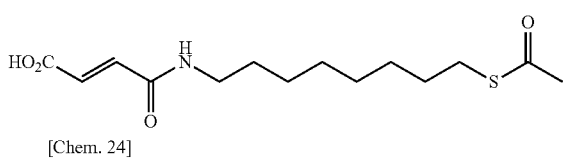

[Chem. 24]

(a-20)
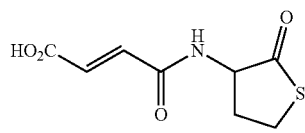

[Chem. 25]

(a-21)
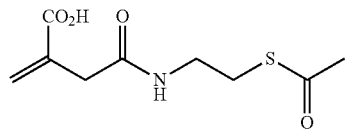

[Chem. 26]

(a-22)
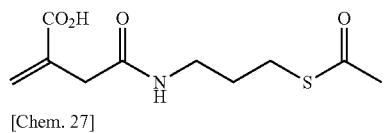

[Chem. 27]

(a-23)
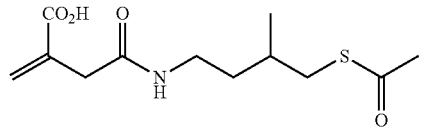

[Chem. 28]

(a-24)
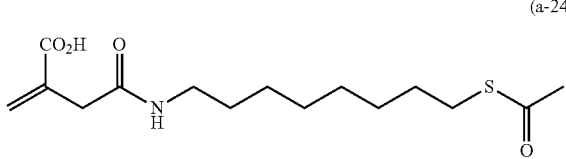

[Chem. 29]

(a-25)
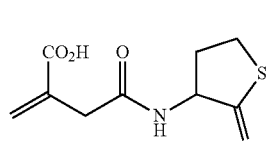

[Chem. 30]

(a-26)
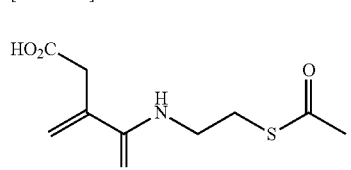

[Chem. 31]

(a-27)
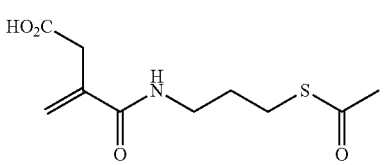

[Chem. 32]

(a-28)
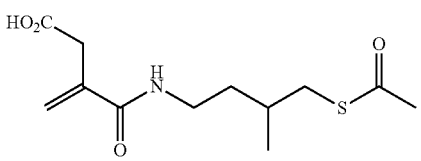

[Chem. 33]

(a-29)
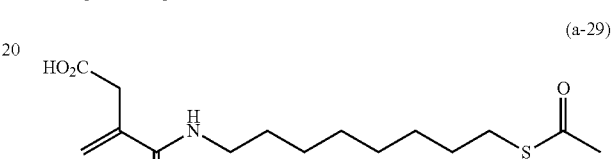

[Chem. 34]

(a-30)
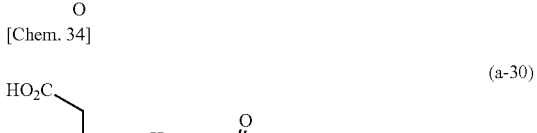

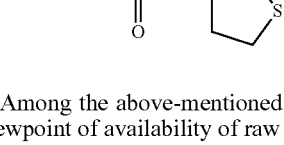

Among the above-mentioned compound group, from the viewpoint of availability of raw materials and facilitation of synthesis, thioacetic acid S-7-octen-1-yl ester, and the thio-ester monomers each represented by (a-6), (a-7), (a-9), (a-10), (a-11), (a-12), (a-14), (a-15), (a-16), (a-17), (a-19), (a-20), (a-21), (a-22), (a-24), (a-25), (a-26), (a-27), (a-29) and (a-30) are preferred.

In the side chain-mercapto group-containing polyvinyl alcohol polymer, the content of the structural unit represented by the formula (I) is not particularly limited. The content of the structural unit represented by the formula (I) may be preferably from 0.05 to 10% by mole, more preferably from 0.1 to 7% by mole, and still more preferably from 0.3 to 6% by mole based on 100% by mole of all the structural units in the polymer. Where the content is too low, the crystallinity of the vinyl alcohol polymer is increased so as to reduce flex resistance of film formed from the polymer in some cases. Where the content is too high, the crystallinity of the vinyl alcohol polymer is lowered so as to decrease water resistance of the film in some cases.

The side-chain mercapto group-containing vinyl alcohol polymer can contain one or more structural units of the formula (I). Where having a plurality of structural units, it is preferable that the total content of the structural units each represented by the formula (I) is in the above range. It should be noted that the structural unit in the polymer refers to a repeating unit that contributes to the formation of the polymer in the present invention. Accordingly, the structural unit includes, for example, the below-mentioned vinyl alcohol units, as well as the below-mentioned vinyl ester units.

The content of vinyl alcohol units in the side-chain mercapto group-containing vinyl alcohol polymer (i.e., saponification degree of side-chain mercapto group-containing vinyl alcohol polymer) is not particularly limited to a specific one. From viewpoint of solubility in water, as for a lower limit, the content of the vinyl alcohol units may be preferably 50% by mole or higher, more preferably 70% by mole or higher, still more preferably 75% by mole or higher, and particularly preferably 80% by mole or higher based on 100% by mole of all the structural units in the polymer. On the other hand, as for an upper limit, the content of the vinyl alcohol units may be preferably 99.94% by mole or lower, more preferably 99.9% by mole or lower, and still more preferably 99.5% by mole or lower based on 100% by mole of all the structural units in the polymer. The vinyl alcohol polymer having a vinyl alcohol unit content of higher than 99.94% by mole generally has difficulty in production process.

The vinyl alcohol units can be derived from a vinyl ester unit by, for example, hydrolysis, alcoholysis or others. Accordingly, there is a possibility that vinyl ester units may remain in the vinyl alcohol polymer in some conditions for conversion of vinyl ester units into vinyl alcohol units. Thus, the side-chain mercapto group-containing vinyl alcohol polymer may contain vinyl ester units.

Examples of the vinyl esters for vinyl ester units may include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate. Among them, preferred one includes vinyl acetate from the industrial point of view.

Within the range that is not adversely interfere the effect of the present invention, the side-chain mercapto group-containing vinyl alcohol polymer can further have a structural unit other than the structural unit represented by the formula (I), the vinyl alcohol units, and the vinyl ester units. Such a structural unit is, for example, a structural unit copolymerizable with a vinyl ester and convertible to the structural unit represented by the formula (I); and a structural unit copolymerizable with a vinyl ester and derived from an ethylenically unsaturated monomer. Examples of ethylenically unsaturated monomers may include α-olefins such as ethylene, propylene, n-butene, isobutylene, and 1-hexene; an acrylic acid and salt thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; a methacrylic acid and salt thereof; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide, N-methylacrylamide, N-ethylacrylamide, N,N-dimethylacrylamide, diacetoneacrylamide, an acrylamidopropanesulfonic acid and salt thereof, an acrylamidopropyldimethylamine and salt (e.g., a quaternary salt) thereof; methacrylamide, N-methylmethacrylamide, N-ethylmethacrylamide, a methacrylamidopropanesulfonic acid and salt thereof, a methacrylamidopropyl dimethylamine and salt (e.g., a quaternary salt) thereof; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, and 2,3-diacetoxy-1-vinyloxypropane; vinyl cyanides such as acrylonitrile and methacrylonitrile; vinyl halides such as vinyl chloride and vinyl fluoride; vinylidene halides such as vinylidene chloride and vinylidene fluoride; allyl compounds such as allyl acetate, 2,3-diacetoxy-1-allyloxypropane, and allyl chloride; unsaturated dicarboxylic acids such as maleic acid, itaconic acid, and fumaric acid, and salts and esters thereof; vinylsilyl compounds such as vinyltrimethoxysilane; and isopropenyl acetate.

In the side-chain mercapto group-containing vinyl alcohol polymer, there is no particular restriction on the arrangement order of the structural unit represented by the formula (I), a vinyl alcohol unit, and any other structural unit. These units may be arranged as a random structure, a block structure, an alternating structure or other structures.

Although there is no particular limitation, the side-chain mercapto group-containing vinyl alcohol polymer may have a viscosity-average degree of polymerization measured according to JIS K6726 of preferably 100 to 5,000, and more preferably 200 to 4,000. Where the viscosity-average degree of polymerization is lower than 100, the mechanical strength of the graft copolymer film to be described later may be reduced. Where the viscosity-average degree of polymerization exceeds 5,000, the side-chain mercapto group-containing vinyl alcohol polymer may have difficulty in industrial production.

The method for producing a side-chain mercapto group-containing vinyl alcohol polymer is not particularly limited as long as the side-chain mercapto group-containing vinyl alcohol polymer of interest can be produced. For example, such a method comprises: copolymerizing (i) vinyl esters with (ii) unsaturated monomers convertible into the structural units represented by the formula (I) and copolymerizable with the vinyl esters; and converting at least a part of the vinyl ester units into vinyl alcohol units by solvolysis, while converting at least a part of the units derived from the unsaturated monomers (ii) into structural units represented by the formula (I) by solvolysis; and other methods.

In particular, from the view point of simplicity, a preferable method comprises: copolymerizing vinyl esters and thioester monomers having unsaturated double bonds represented by the formula (II) (hereinafter referred to as thioester monomer (II)); and subjecting ester bonds of the vinyl ester units and thioester bonds in the structural units of the thioester monomers (II) to hydrolysis or alcoholysis reaction. Hereinafter, this method is described in detail.

Copolymerization of vinyl esters with thioester monomers (II) may be carried out by employing methods and conditions known for homopolymerization of vinyl esters.

It should be noted that during copolymerization, other copolymerizable monomers may be further copolymerized with vinyl esters and thioester monomers (II). Examples of such copolymerizable monomers may be the same as the ethylenically unsaturated monomers described above.

In the obtained copolymer, ester bonds of the vinyl ester units and thioester bonds of the units derived from the thioester monomers (II) are hydrolyzable or alcoholyzable at the substantially same conditions with each other. Accordingly, hydrolysis or alcoholysis of the ester bonds and the thioester bonds can be carried out by using the methods and conditions known in the art for saponification of vinyl ester homopolymer.

As a method of obtaining a vinyl alcohol graft copolymer by using thus obtained side-chain mercapto group-containing vinyl alcohol polymer and polymerizable unsaturated monomers, there may be mentioned a method which applies a method of synthesizing a block copolymer described, for example, in JP Laid-open Patent Publication No. 59-189113, and the like. That is, a vinyl alcohol graft copolymer can be produced by a method comprising:

preparing a side-chain mercapto group-containing vinyl alcohol polymer; and graft-polymerizing an unsaturated monomer onto the side-chain mercapto group-containing vinyl alcohol polymer. The graft polymerization is carried out by conducting radical polymerization of polymerizable unsaturated monomers in the presence of a side-chain mercapto group-containing vinyl alcohol polymer. The radical polymerization can be carried out in the known method, and preferably carried out in a medium such as water and dimethyl sulfoxide as a main component. The polymerization process may employ any of a batch process, a semi-batch process and a continuous process.

The radical polymerization can be carried out by using conventional radical polymerization initiators which is suitable for the polymerization system, and may be selected from 2,2'-azobisisobutyronitrile, 2,2'-azobis[N-(2-hydroxyethyl)-2-methylpropanamide, benzoyl peroxide, lauroyl peroxide, diisopropyl peroxy carbonate, potassium persulfate, ammonium persulfate and the like. Where the polymerization is carried out in an aqueous condition, it is possible to initiate polymerization by redox reaction of mercapto groups as the side chain of vinyl alcohol polymer with an oxidizing agent such as potassium bromate, potassium persulfate, ammonium persulfate, hydrogen peroxide or the like.

Upon the radical polymerization of polymerizable unsaturated monomers in the presence of side-chain mercapto group-containing vinyl alcohol polymers, it is desirable that the polymerization system is in an acidic or neutral condition. This is because that mercapto groups under basic condition tend to be added ionically to double bonds of the monomers and disappeared in a high rate, resulting in significant decrease in polymerization efficiency. Further, where the polymerization is conducted in an aqueous system, it is preferred that to all of the polymerization operations are carried out in the condition of pH 4 or lower.

In the graft copolymer comprising a PVA as a backbone, a graft polymer chain (or graft chain polymer) may comprise a homopolymer or a random copolymer of radically-polymerizable unsaturated monomers. There are no particular restrictions on composition, molecular weight, molecular weight distribution of the graft chain polymers. The content of the polymerizable unsaturated monomer units of the graft chain polymer is preferably 1 to 90% by mole, more preferably 2 to 50% by mole, and still more preferably 3 to 30% by mole based on the total structural units of the graft copolymer. The graft copolymer having the above content is preferred from the view point of flex resistance of a film comprising the graft copolymer. Where the content is lower than 1% by mole, there may be insufficient effect on PVA to be modified by the introduction of graft chains. Where the content exceeds 90% by mole, the film has a decreased strength.

The PVA graft copolymer according to the present invention can be configured to exhibit a wide range of properties by varying the polymerization degree, the degree of saponification, the content of the structural unit represented by the formula (I), etc. of the side-chain mercapto group-containing PVA polymer, and optionally selecting and combining the formulation and molecular weight of the graft polymer chains from a group of radically-polymerizable unsaturated monomer units.

The polymerizable unsaturated monomers used in the synthesis of the graft copolymer by the method described above can be set appropriately depending on the desired properties. For example, α-olefins such as ethylene, propylene, 1-butene, isobutene, and 1-hexene; halogenated olefins such as vinyl chloride, vinyl fluoride, vinylidene chloride, and vinylidene fluoride; vinyl esters such as vinyl formate, vinyl acetate, vinyl propionate, and vinyl versatate; an acrylic acid or salt thereof, or acrylic acid esters such as methyl acrylate, ethyl acrylate, n-propyl acrylate, isopropyl acrylate, and dimethylaminoethyl acrylate; a methacrylic acid or salt thereof, or methacrylic acid esters such as or methyl methacrylate, ethyl methacrylate, n-propyl methacrylate, isopropyl methacrylate, and dimethylaminoethyl methacrylate; other unsaturated carboxylic acids or derivatives thereof such as fumaric acid, maleic acid, itaconic acid, maleic anhydride, and itaconic anhydride; acrylamide derivatives such as acrylamide, N-methyl acrylamide, and N-ethyl acrylamide; methacrylamide derivatives such as methacrylamide, N-methyl methacrylamide, and N-ethyl methacrylamide; vinyl ethers such as methyl vinyl ether, ethyl vinyl ether, n-propyl vinyl ether, isopropyl vinyl ether and n-butyl vinyl ether; hydroxyl group-containing vinyl ethers such as ethylene glycol vinyl ether, 1,3-propanediol vinyl ether, and 1,4-butanediol vinyl ether; hydroxyl group-containing allyl ethers such as allyl ether, propyl allyl ether, butyl allyl ether, and hexyl allyl ether; monomers having oxyalkylene group; isopropenyl acetate, hydroxyl group-containing α-olefins such as 3-butene-1-ol, 4-penten-1-ol, 5-hexene-1-ol, 7-octene-1-ol, 9-decene-1-ol, and 3-methyl-3-butene-1-ol; sulfonic acid group-containing monomers such as an ethylenesulfonic acid or salt thereof, an allylsulfonic acid or salt thereof, a methallylsulfonic acid or salt thereof, and a 2-(meth)acrylamide-2-methylpropanesulfonic acid or salt thereof; phosphonic acid group-containing monomers such as a 2-(meth)acrylamido-2-methyl propanoic acid or salt thereof; carboxylic acid group-containing monomers such as a 2-(meth)acrylamido-2-methylpropanecarboxylic acid or salt thereof; cationic group-containing monomers such as vinylbenzyl trimethylammonium chloride, 3-(methacryloylamino)propyl trimethylammonium chloride, vinyloxyethyl trimethylammonium chloride, vinyloxybutyl trimethylammonium chloride, vinyloxyethyldimethylamine, vinyloxymethyldiethylamine, N-acrylamidomethyl trimethylammonium chloride, N-acrylamidoethyl trimethylammonium chloride, N-acrylamidodimethylamine, allyltrimethylammonium chloride, methallyltrimethylammonium chloride, dimethylallylamine, and allylethylamine; silyl group-containing monomers such as vinyl trimethoxysilane, vinyl triethoxysilane, vinyl triacetoxysilane; styrenic monomers such as styrene, α-methyl styrene, a p-styrenesulfonic acid or salt thereof, an α-methyl-p-styrenesulfonic acid or salt thereof, a p-styrenecarboxylic acid or salt thereof, an α-methyl-p-styrenecarboxylic acid or salt thereof, a p-styrenephosphonic acid or salt thereof, an α-methyl-p-styrenephosphonic acid or salt thereof; vinyl naphthalene based monomers such as a 2-vinylnaphthalenesulfonic acid or salt thereof, a 2-vinylnaphthalenecarboxylic acid or salt thereof, a 2-vinylnaphthalenephosphonic acid or salt thereof; N-vinylpyrrolidone; and others. These polymerizable unsaturated monomers may be used singly or in combination.

Where polymerizable unsaturated monomers dissolvable in water are used as polymerizable unsaturated monomers which provide a graft chain polymer, the obtained PVA graft copolymer is soluble in water so as to be usable as an aqueous polymer solution directly after polymerization.

It should be noted that where polymerizable unsaturated monomers hardly soluble or insoluble in water are used, depending on the polymerization conditions, it is also possible to obtain a dispersion (emulsion) after polymerization. From the viewpoint of setting condition and facilitation of manufacture, it is preferable to use polymerizable unsaturated monomers soluble in water.

There is no particular limitation for the reaction temperature of the radical polymerization. The appropriate reaction temperature may be usually from 0 to 200° C. The timing for stopping the polymerization reaction can be determined by monitoring polymerization transition through the amount of remaining monomers using various chromatographies, an NMR spectrum, etc. so as to adjust the ratio of graft polymer chains (branches) relative to vinyl alcohol polymer backbone in a desired ratio. The polymerization reaction can be stopped by a well-known method, for example, by cooling polymerization system.

By utilizing the above-mentioned characteristics, the vinyl alcohol graft copolymer according to the present invention can be applicable to various usages for vinyl alcohol polymers, singly or as a composition in which another component is added, in accordance with known methods for vinyl alcohol polymers, such as molding, spinning, emulsions and the like. Examples of application may include surfactants for various applications, a paper coating agent, a modifying agent for paper such as an internal additive for paper and a pigment binder; adhesives for wood, paper, aluminum foil, and inorganic material, a nonwoven fabric binder, a paint, a warp sizing agent, fiber processing agent, a sizing agent for hydrophobic fibers, such as polyesters, and other various films, sheets, bottles, fibers, thickeners, flocculants, soil modifiers, ion exchange resins, and ion exchange membranes.

A method of molding or shaping a vinyl alcohol graft copolymer according to the present invention is not limited to a specific one. Examples of molding methods may include molding from a solution (for example, cast molding method) comprising the vinyl alcohol graft copolymer dissolved in a solvent for the polymer such as water or dimethyl sulfoxide or others; molding by heating and plasticizing the polymer (for example, extrusion molding method, injection molding method, inflation molding method, press molding method, and blow molding method). By these molding methods, a molded article having a desired shape such as film, sheet, tube, and bottle can be obtained.

In particular, by selecting the proportion of the structural units of the formula (I) with respective to vinyl alcohol units as a backbone, or the types or content of the polymerizable unsaturated monomers for forming a graft copolymer, it is possible to control water resistance and flex resistance of the molded article which can be derived from the crystalline property of the polymer.

For example, the molded article may have an elution rate of 10% by mass or lower, preferably 9.5% by mass or lower, and more preferably 9% by mass or lower when the elution rate is determined for a molded article immersed for 24 hours in water at 25° C. Here, the elution rate is a value measured by the method described in Examples to be described later.

(Ion-Exchange Membrane)

Hereinafter, ion-exchange membrane as a preferable embodiment formed from the vinyl alcohol graft copolymer according to the present invention is described below. The vinyl alcohol copolymer used in ion-exchange membrane is a vinyl alcohol graft copolymer in which ionic polymers are grafted.

(Ionic Polymer-Grafted Vinyl Alcohol Graft Copolymer)

The ionic polymer-grafted vinyl alcohol graft copolymer can be obtained by graft-polymerizing cationic monomers or anionic monomers onto a side-chain mercapto group-containing vinyl alcohol polymer obtained in the manner described above as a backbone. The above described methods can be applied, as it is, to a method for obtaining an ionic polymer-grafted vinyl alcohol graft copolymer by using a side-chain mercapto group-containing vinyl alcohol polymer and cationic monomers or anionic monomers.

As for the graft chain polymer of the graft copolymer comprising a PVA as a backbone and constituting the ion-exchange membrane according to the present invention, the graft chain polymer may be a homopolymer or a random copolymer of radically polymerizable cationic or anionic monomers. In the graft chain polymer, there is no particular limitation of composition, molecular weight, molecular weight distribution, and others. The content of the cationic or anionic monomers may be preferably 1 to 90% by mole, more preferably 2 to 50% by mole, still more preferably from 2.5 to 40% by mole, and further preferably 3 to 30% by mole based on the all the structural units of the graft copolymer. The graft copolymer containing the cationic or anionic monomers in the above range tends to exhibit flex resistance of the film. Where the content is lower than 1% by mole, there is a possibility that the effective charge density of the ion-exchange membrane is lowered, resulting in reduced selectivity of the counter ion in the membrane. Where the content exceeds 90% by mole, the strength of the film decreases.

(Cationic Monomer)

The cationic group in the cationic monomer used in the synthesis of the graft copolymer by the method described above may be exemplified as an ammonium group, an iminium group, a sulfonium group, a phosphonium group, and the like. Further, the cationic monomers according to the present invention may include monomers containing functional groups partly convertible to an ammonium group or an iminium group in water, such as an amino group or an imino group. Among them, from the viewpoint of industrial availability, the preferable cationic group includes an ammonium group. As the ammonium group, there may be used any of a primary ammonium group (ammonium group), a secondary ammonium group (an alkylammonium group etc.), a tertiary ammonium group (a dialkylammonium group etc.), a quaternary ammonium group (a trialkylammonium group etc.). The preferable ammonium group includes a quaternary ammonium group (trialkylammonium group etc.). There is no particular limitation with respect to counter anions for the cationic groups. Examples of counter anions may include a halide ion, a hydroxide ion, a phosphoric acid ion, a carboxylic acid ion and others. Among them, in view of easy availability, the counter anion may be preferably a halide ion, and more preferably a chloride ion.

Examples of the cationic monomers may include those represented by the following general formulae from (b-1) to (b-7).

[Chem. 35]

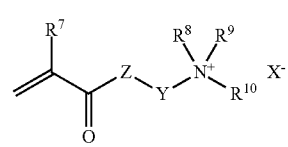

(b-1)

Wherein $R^7$ represents a hydrogen atom or an alkyl group having 1 to 4 carbon atoms; $R^8$, $R^9$ and $R^{10}$ each independently represent a hydrogen atom or an alkyl, aralkyl or aryl group having 1 to 18 carbon atoms which may have a substituent. $R^8$, $R^9$ and $R^{10}$ may form a saturated or unsaturated cyclic structure by connecting with each other; Z represents —O—, —NH—, or —N($CH_3$)—; Y represents a divalent linking group having 1 to 8 carbon atoms which may contain an oxygen, nitrogen, sulfur or phosphorous atom; and $X^-$ represents an anion.

The counter anion $X^-$ in the general formula (b-1) may be exemplified as a halide ion, a hydroxide ion, a phosphoric acid ion, and a carboxylic acid ion. The cationic monomer represented by the general formula (b-1) may include 3-(meth)acrylamide-alkyltrialkylammonium salts such as 3-(meth)acrylamidepropyl trimethylammonium chloride and 3-(meth)acrylamide-3,3-dimethyl-propyl trimethylammonium chloride, and the like.

[Chem. 36]

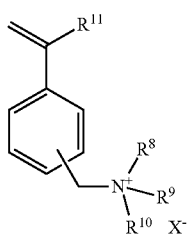

(b-2)

Wherein $R^{11}$ represents a hydrogen atom or a methyl group. $R^8$, $R^9$, $R^{10}$ and $X^-$ are the same as defined in the general formula (b-1).

Examples of the cationic monomers represented by the general formula (b-2) may include vinylbenzyl trialkylammonium salts such as vinylbenzyl trimethylammonium chloride, and the like.

[Chem. 37]

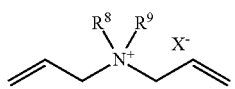

(b-3)

Wherein $R^8$, $R^9$ and $X^-$ are the same as defined in the general formula (b-1).

Examples of the cationic monomer represented by the general formula (b-3) may include diallyldialkylammonium salts such as diallyldimethylammonium chloride and the like.

[Chem. 38]

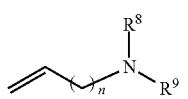

(b-4)

Wherein n represents 0 or 1; $R^8$ and $R^9$ are the same as defined in the general formula (b-1).

Examples of the cationic monomers represented by the general formula (b-4) may include allylamine, vinylamine or the like.

[Chem. 39]

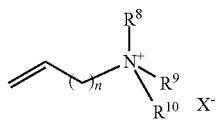

(b-5)

Wherein n represents 0 or 1; $R^8$, $R^9$, $R^{10}$ and $X^-$ are the same as defined in the general formula (b-1).

Examples of the cationic monomer represented by the general formula (b-5) may include allylammonium or vinylammonium salts such as allylamine hydrochloride, vinylamine hydrochloride, or the like.

[Chem. 40]

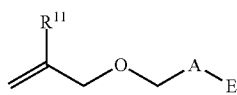

(b-6)

Wherein $R^{11}$ represents a hydrogen atom or a methyl group; A represents —CH(OH)$CH_2$—, —$CH_2$CH(OH)—, —C($CH_3$)(OH)$CH_2$—, —$CH_2$C($CH_3$)(OH)—, —CH(OH)$CH_2CH_2$—, or —$CH_2CH_2$CH(OH)—; E represents —N($R^{12}$)$_2$ or —$N^+$($R^{12}$)$_3$.$X^-$; and $R^{12}$ represents a hydrogen atom or a methyl group.

Examples of the cationic monomer represented by the general formula (b-6) may include N-(3-allyloxy-2-hydroxypropyl)dimethylamine or quaternary ammonium salts thereof, and N-(4-allyloxy-3-hydroxybutyl)diethylamine or quaternary ammonium salts thereof.

[Chem 41]

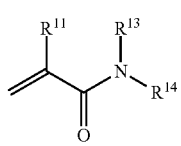

(b-7)

Wherein $R^{11}$ represents a hydrogen atom or a methyl group; $R^{13}$ represents a hydrogen atom, a methyl group, an ethyl group, an n-propyl group, or an i-propyl group; and $R^{14}$ represents a hydrogen atom, a methyl group, or an ethyl group.

Examples of the cationic monomers represented by the general formula (b-7) may include (meth)acrylamide, N-methyl(meth)acrylamide, N-ethyl(meth)acrylamide, N,N-dimethyl(meth)acrylamide, and the like.

The cationic monomers may be used singly or in combination.

(Anionic Monomer)

The anionic group in the anionic monomer used in the synthesis of the graft copolymer by the method described above may be exemplified as a sulfonate group, a carboxylate group, a phosphonate group and the like. Further, the anionic monomers according to the present invention may include monomers containing functional groups partly convertible to a sulfonate group, a carboxylate group, or a phosphonate group in water, such as a sulfonic acid group, a carboxyl group and a phosphonic acid group. Among them, from the viewpoint of high ionic dissociation constant, the preferable anionic group includes a sulfonate group. There is no particular limitation with respect to counter ions for the anionic groups. Examples of counter cations may include a hydrogen ion, and an alkali metal ion. Among them, in view of less corrosion problems of the equipment, the counter cation may be preferably an alkali metal ion.

As the anionic monomer, there may be exemplified compounds represented by the following general formulae (b-8) and (b-9).

[Chem. 42]

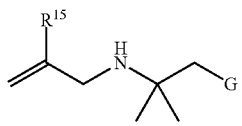

(b-8)

Wherein $R^{15}$ represents a hydrogen atom or a methyl group; G represents —$SO_3H$, —$SO_3^-M^+$, —$PO_3H$, —$PO_3^-M^+$, —$CO_2H$ or $CO_2^-M^+$; $M^+$ represents an ammonium ion or an alkali metal ion.

Examples of the anionic monomers represented by the general formula (b-8) may include a monomer having a sulfonic acid group such as 2-(meth)acrylamido-2-methylpropanesulfonic acid or a salt thereof; a monomer having a phosphonic acid group such as 2-(meth)acrylamido-2-methylpropanephosphonic acid or a salt thereof; a monomer having a carboxylic acid group such as 2-(meth)acrylamido-2-methylpropanecarboxylic acid or a salt thereof; and the like.

[Chem. 43]

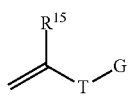

(b-9)

Wherein $R^{15}$ represents a hydrogen atom or a methyl group; T represents a phenylene or naphthylene group which may have a methyl group as a substituent; and G has the same meaning as defined in the general formula (b-8).

Examples of the anionic monomers represented by the general formula (b-9) may include a styrenic monomer such as p-styrenesulfonic acid or a salt thereof, α-methyl-p-styrenesulfonic acid or a salt thereof, p-styrene carboxylic acid or a salt thereof, α-methyl-p-styrene carboxylic acid or a salt thereof, p-styrenephosphonic acid or a salt thereof, α-methyl-p-styrenephosphonic acid or a salt thereof; a vinyl naphthalene monomer such as 2-vinyl naphthalenesulfonic acid or a salt thereof, 2-vinyl naphthalene carboxylic acid or a salt thereof, and 2-vinyl naphthalenephosphonic acid or a salt thereof; and others.

Further, as the anionic monomers, there may be exemplified acrylic acid or a salt thereof; methacrylic acid or a salt thereof; an unsaturated carboxylic acid or a derivative thereof such as fumaric acid, maleic acid, itaconic acid, maleic anhydride, itaconic anhydride and the like; ethylenesulfonic acid or a salt thereof; allylsulfonic acid or a salt thereof; methallylsulfonic acid or a salt thereof; and others.

In the general formulae (b-8) and (b-9), G is preferably a group capable of providing higher charge density, such as a sulfonate groups, a sulfonic acid group, a phosphonate group, or a phosphonic acid group. As the alkali metal ion represented by M in the general formulae (b-8) and (b-9), there may be mentioned a sodium ion, a potassium ion, a lithium ion, and the like.

The anionic monomers may be used singly or in combination.

(Other Ethylenically Unsaturated Monomer)

In the ion-exchange membrane according to the present invention, as for the graft polymer chains in the graft copolymer comprising a PVA as a backbone, the graft polymer chain can further have a structural unit other than structural units derived from the cationic or anionic monomers within the range that does not adversely affect the present invention. Such a structural unit is, for example, a structural unit copolymerizable with the cationic or anionic monomers and derived from an ethylenically unsaturated monomer. Examples of ethylenically unsaturated monomers may include α-olefins such as ethylene, propylene, n-butene, isobutylene, and 1-hexene; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, and 2,3-diacetoxy-1-vinyloxypropane; vinyl cyanides such as acrylonitrile and methacrylonitrile; vinyl halides such as vinyl chloride and vinyl fluoride; vinylidene halides such as vinylidene chloride and vinylidene fluoride; allyl compounds such as ally acetate, 2,3-diacetoxy-1-allyloxypropane, and allyl chloride; vinylsilyl compounds such as vinyltrimethoxysilane; and isopropenyl acetate.

In the graft copolymer comprising a PVA as a backbone, there is no particular restriction with respect to the graft polymer chain on the arrangement order of the structural unit derived from cationic or anionic monomers and any other structural unit, and these units may be arranged as a random structure, a block structure, an alternating structure or other structures.

(Ion-Exchange Membrane)

The ion-exchange membrane according to the present invention can be formed from a vinyl alcohol graft copolymer. As long as capable of forming a membrane structure, a variety of methods can be applicable such as molding from a solution of the vinyl alcohol graft copolymer dissolved in a solvent for the polymer (for example, cast molding method); and molding by the use of heating the polymer to be plasticized (for example, extrusion molding method, inflation molding method). Among them the cast molding method is preferably used.

It should be noted that the ion-exchange membrane of the present invention may contain a vinyl alcohol graft copolymer as a main component, and if necessary, further various additives.

In the cast molding method, a film can be obtained by forming a film from a solution of the graft copolymer. The film forming process comprises: providing a solution prepared by dissolving a graft copolymer in its soluble solvent; and casting the solution, followed by drying so as to form a film or membrane.

As the solvent used for the solution of the graft copolymer, there may be mentioned water; a lower alcohol such as methanol, ethanol, 1-propanol and 2-propanol; or a mixed solvent thereof.

In the film-forming process, a film can be normally obtained by removing the solvent in the solution by the casting. The temperature during the film-forming process is not particularly limited to a specific one. The suitable temperature range may be from a room temperature to about 100° C.

The production process of the ion-exchange membrane according to the present invention may preferably comprise heat treating process (heat treatment) in addition to the film-forming process. The heat treatment can generate physical crosslinking between polymer molecules so as to increase the mechanical strength of the ion-exchange membrane. The method for heat treatment is not particularly limited to a specific one. The heat treatment is generally carried out using a hot air dryer. The heat treatment temperature is not particularly limited, and may be preferably from 50 to 250° C. Where the heat treatment temperature is lower than 50° C., there is a possibility that the mechanical strength of the obtained ion-exchange membrane is insufficient. The heat treatment temperature is more preferably 80° C. or higher, and still more preferably 100° C. or higher. On the other hand, where the heat treatment temperature exceeds 250° C., there is a possibility that the crystallized polymers are melted. The heat treatment temperature is more preferably 230° C. or lower, and still more preferably 200° C. or lower.

The production process of the ion-exchange membrane according to the present invention may preferably comprise (chemical) crosslinking treatment in addition to the film-forming process. The crosslinking treatment can increase the mechanical strength of the obtained ion-exchange membrane. The method for cross-linking treatment is not particularly limited as long as molecular chains between polymers can be cross-linked by chemical bonding. Usually, a method of immersing the film in a solution containing a crosslinking agent is used. Examples of the crosslinking agent may include formaldehyde; or dialdehyde compounds such as glutaraldehyde and glyoxal; and the like. According to the present invention, preferable treatment is such that a heat-treated film is immersed in a solution containing a dialdehyde compound dissolved in water, an alcohol or a mixed solvent thereof under acidic condition so as to form crosslinking. The concentration of crosslinking agent is usually from 0.001 to 10% by volume in the solution.

The production process of the ion-exchange membrane according to the present invention may comprise both heat treatment and crosslinking treatment, or may comprise either one of them. Where carrying out both heat treatment and crosslinking treatment, the crosslinking treatment may be carried out after the heat treatment; the heat treatment may be carried out after the crosslinking treatment; or both treatments may be carried out around the same time. The preferable process includes one carrying out crosslinking treatment after the heat treatment from the viewpoint of mechanical strength of the ion-exchange membrane.

The ion-exchange membrane according to the present invention may preferably have a membrane thickness about from 1 to 1,000 μm from the viewpoint of properties required for electric dialysis membrane, film strength and handling properties. Where the thickness is less than 1 μm, the mechanical strength of the film may be insufficient. In contrast, where the thickness exceeds 1,000 μm, the film has an increased resistance so as to fail to express a sufficient ion exchange property, resulting in less efficient electrodialysis. The thickness may be more preferably from 5 to 500 μm, and still more preferably from 7 to 300 μm.

In particular, since the ion-exchange membrane of the present invention has high flex resistance, the membrane can be used as a free-standing single-layered film without using a support. Where the membrane is used as a single layer, the membrane thickness may be, for example, preferably 30 μm or more, and more preferably 50 μm or more.

In order for ion-exchange membrane to exhibit sufficient ion exchange properties in electrodialysis, the ion-exchange membrane preferably has an ion exchange capacity of 0.3 mmol/g or higher, and more preferably 0.5 mmol/g or higher. As for an upper limit of the ion exchange capacity of the graft copolymer, since too high ion exchange capacity tends to generate increased hydrophilicity and it becomes difficult to control the swelling degree of the membrane, the ion exchange capacity may be preferably 5.0 mmol/g or lower, and more preferably 4.0 mmol/g or lower.

As for the ion-exchange membrane, it is possible to control the swelling degree in water. The ion-exchange membrane may have a swelling degree represented by the following formula, for example, preferably from 1.00 to 1.68, more preferably from 1.10 and 1.66, and still more preferably from 1.20 to 1.63.

$$\text{Swelling degree} = [W_1]/[W_2]$$

(In the formula, $W_1$ represents a mass of a membrane reached to swelling equilibrium in ion-exchanged water at 25° C.; $W_2$ represents a mass of the membrane after drying the membrane used for measuring $W_1$ at 40° C. for 12 hours under vacuum.)

EXAMPLES

Hereinafter, the present invention will be demonstrated by way of some Examples and Comparative Examples that are presented only for the sake of illustration, which are not to be construed as limiting the scope of the present invention.

[Synthesis of Side-Chain Mercapto Group-Containing PVA]

<PVA-1>

(1) Into a reactor equipped with a stirrer, a reflux condenser, an argon feed tube, and a port for adding a polymerization initiator, were charged 450 parts by mass of vinyl acetate, 9.9 parts by mass of thioacetic acid S-7-octen-1-yl ester represented by the following formula (II-2) as a comonomer, and 121 parts by mass of methanol. The reaction system was purged with argon by argon bubbling for 30 minutes. After heating the reactor to increase the temperature thereof, 0.36 parts by mass of 2,2'-azobisisobutyronitrile was added into the reactor having an internal temperature of 60° C. so as to initiate polymerization. After polymerization for 4 hours at 60° C., the polymerization was terminated by cooling. The polymerization ratio at the time of termination was 38%. Subsequently, unreacted monomers were removed from the reaction system with occasional addition of methanol at 30° C. under reduced pressure to obtain a methanol solution (concentration 35.6%) of a polyvinyl acetate into which the thioacetic acid S-7-octen-1-yl ester represented by the following formula (II-2) was introduced. It should be noted that the thioacetic acid S-7-octen-1-yl ester represented by the following formula (II-2) was synthesized in a manner described in U.S. Pat. No. 3,632,826.

[Chem. 44]

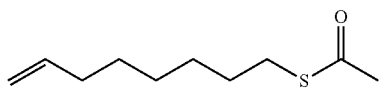

(II-2)

(2) Into 280.9 parts by mass of the methanol solution of thioester group-containing polyvinyl acetate, were added 39.7 parts by mass of methanol (amount of the thioester group-containing polyvinyl acetate in the solution was 100 parts by mass), and further 12.7 parts by mass of a sodium hydroxide solution in methanol (concentration 12.8%) to carry out saponification at 40° C. (concentration of thioester group-containing polyvinyl acetate in the saponification solution: 30%; molar ratio of sodium hydroxide relative to the vinyl acetate unit in the thioester group-containing polyvinyl acetate: 0.035). At about 8 minutes after adding the sodium hydroxide solution in methanol, a gelled-like material was produced. The gelled-like material was then pulverized by a pulverizer, so as to be subjected further saponification for 52 minutes at 40° C. After neutralization of the remaining alkali by adding methyl acetate, the resultant was washed sufficiently with methanol, and dried for 12 hours at 40° C. in a vacuum dryer so as to obtain a side-chain mercapto group-containing PVA (PVA-1). Table 1 shows synthesis conditions. The chemical shift values obtained by $^1$H-NMR spectroscopy are shown below. The content (modification amount) of the structural units represented by the formula (I) and the content of vinyl alcohol units (degree of saponification) determined by $^1$H-NMR are also shown in Table 1. Further, Table 1 shows the viscosity-average degree of polymerization measured according to JIS K6726.

$^1$H-NMR (270 MHz, D$_2$O (containing DSS), 60° C.) δ (ppm): 1.3-1.9 (—CH$_2$CH(OH)— and —CH$_2$CH(CH$_2$CH$_2$CH$_2$CH$_2$CH$_2$CH$_2$SH)—), 2.05-2.15 (—CH$_2$CH(OCOCH$_3$)—), 2.51-2.61 (—CH$_2$CH(CH$_2$CH$_2$CH$_2$CH$_2$CH$_2$CH$_2$SH)—), 3.9-4.2 (—CH$_2$CH(OH)—)

(Synthesis of Thioester Monomer (a-9))

Into a reactor were charged 14.6 parts by mass of 1-amino-7-octene hydrochloride, 10.2 parts by mass of thioacetic acid and 100 parts by mass of tetrahydrofuran, followed by purging argon for 20 minutes. Thereafter still under argon atmosphere, was charged 1.5 parts by mass of 2,2'-azobisisobutyronitrile, and the mixture was heated under reflux for 2 hours. After cooling the mixture to room temperature, was added 1.5 parts by mass of hydroquinone, and the solvent was evaporated under reduced pressure. Thus obtained solid material was purified by recrystallization with methyl acetate to obtain 15.4 parts by mass of S-aminooctyl thioacetate hydrochloride.

Next, into another reactor, were charged 15.4 parts by mass of the obtained S-aminooctyl thioacetate hydrochloride, 19.7 parts by mass of triethylamine, 0.3 part by mass of hydroquinone, and 100 parts by mass of tetrahydrofuran, followed by heating for 30 minutes under reflux. The mixture was cooled to 0° C., and then 7.5 parts by mass of methacryloyl chloride were added dropwise over 2 hours. Thereafter, the temperature of the reactor was elevated to room temperature, followed by stirring for another 30 minutes to complete the reaction. After removing the solvent under reduced pressure, liquid separation was carried out by using ethyl acetate and an aqueous sodium bicarbonate (concentration: 5% by mass), followed by condensing the extracted ethyl acetate phase to obtain a crude product. Thus obtained crude product was subjected to isolation and purification by silica gel column chromatography to obtain a thioester monomer (a-9). The result of $^1$H-NMR analysis is shown below.

$^1$H-NMR (270 MHz, DMSO-d$_6$, TMS) δ (ppm): 1.2-1.5 (12H, SCH$_2$CH$_2$CH$_2$CH$_2$CH$_2$CH$_2$CH$_2$CH$_2$NH), 1.82 (3H, CH$_2$CCH$_3$), 2.30 (3H, SCOCH$_3$), 2.81 (2H, SCH$_2$CH$_2$), 3.05 (2H, CH$_2$CH$_2$NH), 5.27 (1H, CH$_2$CCH$_3$), 5.60 (1H, CH$_2$CCH$_3$), 7.86 (1H, CH$_2$NH)

<PVA-2>

(1) Into a reactor equipped with a stirrer, a reflux condenser, an argon feed tube, a port for adding a comonomer and a port for adding a polymerization initiator, were added 450 parts by mass of vinyl acetate, 0.61 part by mass of the thioester monomer (a-9) as a comonomer, and 302 parts by mass of methanol. The reaction system was purged with argon by argon bubbling for 30 minutes. Alternatively, a thioester monomer (a-9) solution in methanol (concentration 4% by mass) was prepared and sequentially added as a comonomer solution (hereinafter referred to as delay solution), and purged with argon by argon bubbling for 30 minutes. After heating the reactor to increase the temperature thereof, 0.1 part by mass of 2,2'-azobisisobutyronitrile was added into the reactor having an internal temperature of 60° C. to initiate polymerization. During polymerization reaction, the prepared delay solution was added into the reaction system so as to keep constant the molar ratio of monomers in the reaction solution (molar ratio of vinyl acetate to thioester monomer (a-9)). After polymerization for 210 minutes at 60° C., the polymerization was terminated by cooling. The polymerization ratio at the time of termination was 40%. Subsequently, unreacted monomers were removed from the reaction system with occasional addition of methanol at 30° C. under reduced pressure to obtain a methanol solution (concentration 38.5%) of a polyvinyl acetate into which the thioester monomer (a-9) was introduced.

(2) Into 259.7 parts by mass of the methanol solution of the polyvinyl acetate containing the thioester monomer (a-9), were added 59.1 parts by mass of methanol (the amount of polyvinyl acetate containing the thioester monomer (a-9) in the solution was 100 parts by mass), and further a sodium hydroxide solution in methanol (concentration 12.8%) to carry out saponification at 40° C. (Concentration of polyvinyl acetate containing the thioester monomer (a-9) in the saponification solution: 30%; molar ratio of sodium hydroxide to vinyl acetate unit in the polyvinyl acetate containing the thioester monomer (a-9): 0.040). At about 8 minutes after adding the sodium hydroxide solution in methanol, gelled-like material was produced. The gelled-like material was then pulverized by a pulverizer, so as to be subjected further saponification for 52 minutes at 40° C. After neutralization of the remaining alkali by adding methyl acetate, the resultant was washed sufficiently with methanol, and dried for 12 hours at 40° C. in a vacuum dryer so as to obtain a side-chain mercapto group-containing PVA (PVA-2). Table 1 shows synthesis conditions. The chemical shift values obtained by $^1$H-NMR spectroscopy are shown below. The content (modification amount) of the structural units represented by the formula (I) and the content of vinyl alcohol units (degree of saponification) determined by $^1$H-NMR are also shown in Table 1. Further, Table 1 shows the viscosity-average degree of polymerization measured according to JIS K6726.

$^1$H-NMR (270 MHz, D$_2$O (containing 3-(trimethylsilyl)-1-propanesulfonic acid sodium: DSS), 60° C.) δ (ppm): 0.9-1.1 (—CH$_2$CCH$_3$), 1.3-1.9 (—CH$_2$CH(OH)—, NHCH$_2$CH$_2$CH$_2$CH$_2$CH$_2$CH$_2$CH$_2$SH), 2.0-2.2 (—CH$_2$CH(OCOCH$_3$)—), 2.5-2.6 (CH$_2$CH$_2$SH), 3.5-4.2 (—CH$_2$CH(OH)—, CONHCH$_2$CH$_2$)

<PVA-3 to PVA-7>

Except for changing polymerization condition (the type of comonomer used in polymerization and the initial charge <PVA-4 to PVA-7>

$^1$H-NMR (270 MHz, D$_2$O (containing DSS), 60° C.) δ (ppm): 1.3-1.9 (—CH$_2$CH(OH)—), 2.0-2.2 (—CH$_2$CH(OCOCH$_3$)—), 2.5-2.6 (CONHCH$_2$CH$_2$SH), 3.5-4.2 (—CH$_2$CH(OH)—, —CH(COOH)CH—, CONHCH$_2$CH$_2$SH)

TABLE 1

| | Polymerization condition | | | | Saponification condition | | Properties of modified polyvinyl alcohol | | |
|---|---|---|---|---|---|---|---|---|---|
| | Initial charge | | | | | | | | |
| | | Comonomer | | | | | | | |
| | Vinyl acetate (parts by mass) | Species | Amount (parts by mass) | Methanol (parts by mass) | Polymerization ratio (mol %) | Concentration (%) | NaOH molar ratio | Polymerization degree | Modification ratio (mol %) | Saponification degree (mol %) |
| PVA-1 | 450 | TOE | 9.9 | 121 | 38 | 30 | 0.035 | 1600 | 0.5 | 98.4 |
| PVA-2 | 450 | a-9 | 0.61 | 302 | 40 | 30 | 0.040 | 1100 | 0.5 | 98.4 |
| PVA-3 | 450 | a-9 | 0.32 | 152 | 40 | 30 | 0.020 | 1600 | 0.5 | 87.0 |
| PVA-4 | 450 | a-11 | 0.64 | 330 | 40 | 30 | 0.035 | 1000 | 1.0 | 97.9 |
| PVA-5 | 450 | a-11 | 0.19 | 76 | 40 | 20 | 0.035 | 2400 | 0.3 | 97.6 |
| PVA-6 | 450 | a-11 | 1.99 | 714 | 40 | 40 | 0.020 | 500 | 3.0 | 88.0 |
| PVA-7 | 450 | a-11 | 0.32 | 345 | 40 | 30 | 0.035 | 1000 | 0.5 | 97.9 |

TOE: thioacetic acid S-7-octen-1-yl ester,
Polymerization ratio: polymerization ratio of vinyl acetate used
NaOH molar ratio: molar ratio of sodium hydroxide to vinyl acetate unit in the charged polymer amounts of vinyl acetate monomer, comonomer, and methanol) and saponification conditions (the molar ratio of sodium hydroxide relative to vinyl acetate units and the concentration of the modified polyvinyl acetate) as shown in Table 1, side-chain mercapto group-containing PVAs (PVA-3 to PVA-7) were synthesized in the same way as PVA-2. It should be noted that the thioester monomer (a-11) was synthesized by the following method. As for the PVA-4 to PVA-7, chemical shift values obtained by $^1$H-NMR spectroscopy were shown below. The content (modification amount) of the structural units represented by the formula (I) and the content of vinyl alcohol units (degree of saponification) determined by $^1$H-NMR are also shown in Table 1. Further, Table 1 shows the viscosity-average degree of polymerization measured according to JIS K6726.

(Synthetic Thioester Monomer (a-11))

Into a reactor were charged 3.1 parts by mass of 2-aminoethanethiol hydrochloride and 20 parts by mass of methylene chloride, followed by adding dropwise 4.3 parts by mass of acetyl chloride at room temperature and heating under reflux for 4 hours. After cooling to room temperature, precipitated solid material was filtered and washed with methylene chloride to give 4.1 parts by mass of thioacetate S-aminoethyl hydrochloride.

Next, into another reactor, were charged 1.5 parts by mass of the obtained thioacetate S-aminoethyl hydrochloride, 1.0 part by mass of maleic anhydride, 0.8 part by mass of sodium acetate, and 50 parts by mass of acetic acid, followed by stirring for 4 hours at room temperature. After addition of 100 parts by mass of water, the mixture was further stirred for another 5 hours to precipitate a solid material. The solid material was filtered off to obtain 1.4 parts by mass of a thioester monomer (a-11). The result of $^1$H-NMR analysis is shown below.

$^1$H-NMR (270 MHz, DMSO-d$_6$, TMS) δ (ppm): 2.33 (3H, SCOCH$_3$), 3.07 (2H, SCH$_2$CH$_2$NH), 3.45 (2H, SCH$_2$CH$_2$NH), 4.89 (1H, SCH$_2$CH$_2$NH), 6.24 (1H, COCHCHCO), 6.42 (1H, COCHCHCO)

[Synthesis of Terminal Mercapto Group-Containing PVA]

<PVA-8>

According to the method described in JP Patent Laid-open Publication No. 59-187005, a vinyl alcohol polymer having a mercapto group at a terminal (PVA-8) was synthesized. The content of vinyl alcohol units determined by $^1$H-NMR (degree of saponification) was 98.5% by mole and the viscosity-average degree of polymerization measured according to JIS K6726 was 1,500.

In Examples 1-1 to 1-4 and Comparative Examples 1-1 and 1-2, the film properties were evaluated as below.

[Evaluation of Water Resistance]

Onto a mold of 15 cm×15 cm prepared by folding the end of a polyethylene terephthalate film, was casted 15 parts by mass of the water-soluble polymer aqueous solution each obtained in Examples and Comparative Examples. The solvent was sufficiently evaporated at room temperature under atmospheric pressure, followed by heating the dried material for 10 minutes at 120° C. to obtain a sample film with about 100 μm thickness.

Thus obtained film was immersed in room temperature water for 24 hours, and then taken off from the water. The film was dried at 40° C. for 12 hours under vacuum and measured its mass (Wa). The elution rate was calculated from thus obtained mass (Wa) and the mass (Wb) before immersion in accordance with the following equation. The elution rate was used as an index of water resistance.

Elution rate (% by mass)=100×([Wb]−[Wa])/[Wb]

[Flex Resistance Test (1)]

The sample film was cut to a size of 5 cm×10 cm. Bending and returning operation of the cut film was repeated 10 times by bending at 90 degrees with pinching both ends of the film and returning to evaluated flex resistance of the film in accordance with three stages by the following criteria.

A: The film was not broken even more than 10-time bending operation.

B: The film was broken during 5- to 10-time bending operation.

C: The film was broken during 1- to 4-time bending operation.

In Examples 2-1 to 2-11 and Comparative Examples 2-1 to 2-2, the properties of the ion-exchange membrane were evaluated as below.

[Flex Resistance Test (2)]

The sample film was cut to a size of 5 cm×10 cm. Winding operation of the cut film was carried out by subjecting the film to be wound around a round bar having a diameter of 2 mm at 180 degrees and to be unwound straight repeatedly to measure the timing when the film was broken. The evaluation was determined as an average of three sample films. Where the three of the films were not broken even after 10-time winding operation, it was evaluated as A.

[Measurement of Cation Exchange Capacity]

A cation-exchange membrane was immersed in a 0.1 mol/L KCl aqueous solution for 10 hours or longer in order to replace the counter ions into potassium ions, and washed with deionized water. Thereafter the potassium ion type membrane was converted into a sodium ion type membrane with a 0.1 mol/L of $NaNO_3$ aqueous solution so as to quantify an amount of liberated potassium ions (A: mol) by a chromatography (ICS-1600 Nippon Dionex Corporation).

Next, the same cation-exchange membrane was immersed in a $1\times10^{-4}$ mol/L NaCl aqueous solution for 4 hours or longer, and thoroughly washed with deionized water to be taken off. The taken-off membrane was thoroughly dried in a vacuum dryer so as to measure dry weight $W_1$ (g). The ion exchange capacity of the membrane was calculated by the following equation:

$$\text{Ion exchange capacity} = A \times 1000/W_1 \text{[mmol/g-dry film]}$$

[Measurement of Anion Exchange Capacity]

An anion-exchange membrane was immersed in a 0.1 mol/L KCl aqueous solution for 10 hours or longer in order to be replaced into chloride ion type, and washed with deionized water. Thereafter the chloride ion type membrane was converted into a nitrate ion type membrane with a 0.1 mol/L of $NaNO_3$ aqueous solution so as to quantify an amount of liberated chloride ions (B: mol) by a chromatography (ICS-1600 Nippon Dionex Corporation).

Next, the same anion-exchange membrane was immersed in a 0.1 mol/L NaCl aqueous solution for 4 hours or longer, and thoroughly washed with deionized water to be taken off. The taken-off membrane was thoroughly dried in a vacuum dryer so as to measure dry weight $W_2$ (g). The ion exchange capacity of the membrane was calculated by the following equation:

$$\text{Ion exchange capacity} = B \times 1000/W_2 \text{[mmol/g-dry film]}$$

[Measurement of Dynamic Transport Number]

The dynamic transport number of the ion-exchange membrane was measured using a dynamic transport number test device shown in FIG. 1. The device provides a power supply 1, an ampere meter 2, a coulomb meter 3, a voltmeter 4, and a stirrer 6 which is rotated using a motor 5. In a two-compartment cell 9 having two electrode plates to be a cathode electrode 7 (AgCl electrode) and an anode electrode 8 (Ag electrode), an ion-exchange membrane 10 was sandwiched to be filled with a 0.5 mol/L NaCl solution on both sides of the membrane. During a predetermined period of time (t), electrodialysis was carried out at a predetermined current density (J=10 mA·cm$^{-2}$). The effective membrane area of the ion-exchange membrane 10 in the two-compartment cell 9 was 8.0 cm$^2$ (2 cm×4 cm). Thereafter, the measurement solution was taken out, and the solution was diluted in a 300 mL volumetric flask. The value of conductivity of the diluted solution was measured by a conductivity meter. The dynamic transport number td+ was calculated by substituting the obtained value of the conductivity into the following equation: td+=Δm/Ea.

td+: dynamic transport number
Δm: moved equivalent
Ea: theoretical equivalent amount=I×t/F
I: current
t: measurement time (power-on time)
F: Faraday constant

[Measurement of Membrane Resistance]

Figure 2:
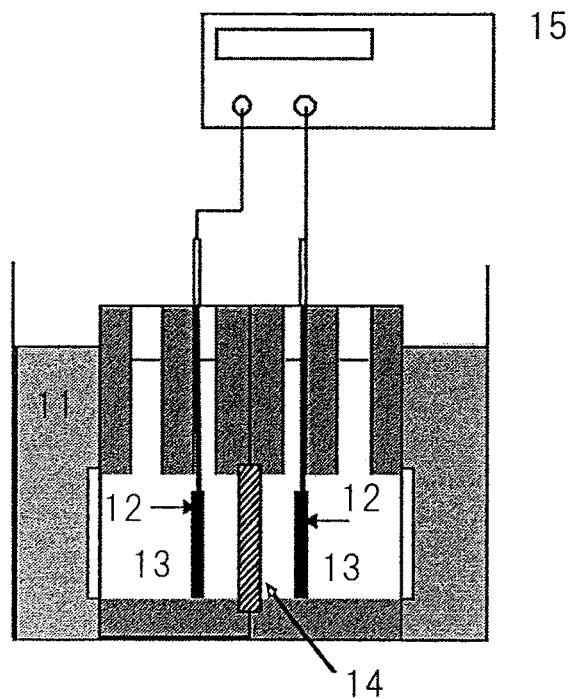
FIG. 2 is a schematic view of a testing device for measuring a membrane resistance of the ion-exchange membrane.

As a pre-treatment, a sample to be measured was immersed in a 0.5 mol/L NaCl solution until equilibrium is reached. A test device for measuring membrane resistance as shown in FIG. 2 was used. An ion-exchange membrane 14 was interposed in a two-compartment cell 13 mounted in a water bath 11, each cell comprising a platinum black electrode plate to be an electrode 12. Subsequently a NaCl solution (0.5 mol/L) was charged so that both sides of the membrane were filled with the solution. An LCR meter 15 was connected to the both electrodes to measure resistance between the electrodes at 25° C. with operating AC bridge (frequency: 1,000 cycles/sec). The effective membrane area of the ion-exchange membrane 14 in the two-compartment cell 13 was 1.0 cm$^2$. Difference in resistance under the conditions between with and without the cation-exchange membrane 14 was calculated so as to be evaluated as membrane resistance.

[Evaluation of Swelling Degree]

Each of the ion-exchange membranes obtained in Examples and Comparative Examples was cut into a size of 5 cm×10 cm, and subjected to be wiped off surface water thereof with tissue paper. The mass ($W_1$) of the membrane was measured. Thereafter the membrane was dried at 40° C. for 12 hours under vacuum to measure a mass ($W_2$). The swelling degree was calculated according to the following equation:

$$\text{Swelling degree} = [W_1]/[W_2]$$

Example P-1

Into a four-necked separable flask (1 L) equipped with a reflux condenser and a stirrer, were charged 407 g of water and 110 g of PVA-1 as a side-chain mercapto group-containing polyvinyl alcohol, followed by heating under stirring up to 95° C. to dissolve the side-chain mercapto group-containing polyvinyl alcohol, and then was cooled to room temperature. The pH of the aqueous solution was adjusted to pH 3.0 by the addition of sulfuric acid ½ N. Into this mixture was added 18.1 g of acrylic acid (AA) with stirring, followed by heating the mixture until 70° C. with bubbling of nitrogen, and further continued bubbling of nitrogen for 30 minutes at 70° C. to carry out nitrogen purge. After nitrogen purge, into the aqueous solution was sequentially added 88.8 mL of a 2.5% potassium persulfate (KPS) aqueous solution over 1.5 hours to initiate graft copolymerization. The reaction was allowed to proceed with maintaining the temperature in the system at 75° C. for 1 hour, and then cooled to obtain an aqueous solution of a water-soluble polymer (P-1) being a graft copolymer of polyvinyl alcohol and polyAA at a solid concentration of 20%. After drying a portion of the resulting aqueous solution, the dried material was dissolved in heavy water to be subjected to $^1$H-NMR measurement. The content of the polymerizable unsaturated monomers in the graft copolymer, i.e., the ratio of the AA monomer units relative to the total monomer units of the polymer, was 10% by mole.

Example P-2 to P-23

Except for changing the type of PVA, type and the charged amount of polymerizable unsaturated monomer, and water content as shown in Table 2, graft copolymers (P-2 to P-23) were synthesized in the same way as P-1. Table 2 shows the polymerizable unsaturated monomer content in the graft copolymer which is obtained from the $^1$H-NMR.

Comparative Example P-24

Except for changing the type of PVA, the type and charged amount of polymerizable unsaturated monomer, and water content as shown in Table 2, a graft copolymer (P-24) was synthesized in the same way as P-1. It should be noted that the PVA used in Comparative Example 24 is a PVA without mercapto group (Kuraray Co. Ltd., PVA110). Table 2 shows the polymerizable unsaturated monomer content of the graft copolymer which is obtained from the $^1$H-NMR.

Comparative Example P-25

According to the method described in Patent Document 3, a fibrous graft copolymer having a PVA as a backbone and a polyacrylic acid as a graft chain was synthesized. Into an emulsion containing 8 mL of 3-mercaptopropyltrimethoxysilane and 172 mL of water, PVA fibers were immersed in a bath ratio of 20:1 at 80° C. for 2 hours for coupling treatment. After treatment, fibers were washed with water to give silane-coupled fibers.

The silane-coupled fibers were adjusted to have about 100% pick-up, and then immersed in a solution for graft reaction containing 25 mL of AA, 475 mL of water, and 0.2% potassium persulfate in a bath ratio of 20:1 at 60° C. for 2 hours. After the treatment, the treated fibers were washed with water and dried to give a graft copolymer (P-25). The ratio of the AA monomer units in the total monomer units of the polymer, was 7% by mole.

Comparative Examples P-26 to P-27

Except for changing the type of PVA, the type and charged amount of polymerizable unsaturated monomer, and water content as shown in Table 2, water soluble polymers (P-26 and P-27) were synthesized in the same way as P-1. It should be noted that the PVA used in each of Comparative Examples P-26 and P-27 is a PVA having a mercapto group at a terminal (PVA-8).

TABLE 2

| Example No. (Sample No.) | PVA Type | Charged amount g | Water soluble monomer Type | Charged amount g | H$_2$O Content g | Polymerization initiator (potassium persulfate) Concentration mass % | Polymerization Content mL | Polymerization period Hours | Copolymer Solid content mass % | Content of polymerizable unsaturated monomer mol % |
|---|---|---|---|---|---|---|---|---|---|---|
| P-1 | PVA-1 | 110 | AA | 18.1 | 407 | 2.5 | 88.8 | 1.5 | 20 | 10 |
| P-2 | PVA-1 | 110 | AA | 5.3 | 356 | 2.5 | 88.8 | 1.5 | 20 | 3 |
| P-3 | PVA-1 | 110 | VBTMAC | 57.1 | 563 | 2.5 | 88.8 | 1.5 | 20 | 10 |
| P-4 | PVA-1 | 110 | VBTMAC | 83.6 | 669 | 2.5 | 88.8 | 1.5 | 20 | 14 |
| P-5 | PVA-1 | 110 | PSS | 10.2 | 376 | 2.5 | 88.8 | 1.5 | 20 | 2 |
| P-6 | PVA-1 | 110 | AMPS | 300.6 | 1537 | 2.5 | 88.8 | 1.5 | 20 | 35 |
| P-7 | PVA-2 | 110 | AA | 105.9 | 758 | 2.5 | 88.8 | 1.5 | 20 | 50 |
| P-8 | PVA-2 | 110 | AA | 25.7 | 438 | 2.5 | 88.8 | 1.5 | 20 | 14 |
| P-9 | PVA-2 | 110 | MAPTAC | 28.2 | 447 | 2.5 | 88.8 | 1.5 | 20 | 5 |
| P-10 | PVA-2 | 110 | PSS | 55.6 | 557 | 2.5 | 88.8 | 1.5 | 20 | 10 |
| P-11 | PVA-2 | 110 | AMPS | 139.6 | 893 | 2.5 | 88.8 | 1.5 | 20 | 20 |
| P-12 | PVA-3 | 110 | AA | 25.7 | 438 | 2.5 | 88.8 | 1.5 | 20 | 14 |
| P-13 | PVA-3 | 110 | AA | 58.6 | 569 | 2.5 | 88.8 | 1.5 | 20 | 30 |
| P-14 | PVA-4 | 110 | VBTMAC | 83.6 | 669 | 2.5 | 88.8 | 1.5 | 20 | 14 |
| P-15 | PVA-4 | 110 | MAPTAC | 28.2 | 448 | 2.5 | 88.8 | 1.5 | 20 | 5 |
| P-16 | PVA-4 | 110 | PSS | 55.6 | 557 | 2.5 | 88.8 | 1.5 | 20 | 10 |
| P-17 | PVA-4 | 110 | AMPS | 37.8 | 486 | 2.5 | 88.8 | 1.5 | 20 | 7 |
| P-18 | PVA-5 | 110 | AA | 18.1 | 407 | 2.5 | 88.8 | 1.5 | 20 | 10 |
| P-19 | PVA-6 | 110 | AA | 18.1 | 407 | 2.5 | 88.8 | 1.5 | 20 | 10 |
| P-20 | PVA-7 | 110 | VBTMAC | 57.1 | 563 | 2.5 | 88.8 | 1.5 | 20 | 10 |
| P-21 | PVA-7 | 110 | MAPTAC | 178.4 | 1048 | 2.5 | 88.8 | 1.5 | 20 | 25 |
| P-22 | PVA-7 | 110 | AMPS | 42.0 | 503 | 2.5 | 88.8 | 1.5 | 20 | 7 |
| P-23 | PVA-7 | 110 | AMPS | 62.0 | 583 | 2.5 | 88.8 | 1.5 | 20 | 10 |
| P-24 | PVA110 | 110 | AA | 18.1 | 407 | 2.5 | 88.8 | 1.5 | 20 | 10 |
| P-25 | | | | | | | | | | 7 |
| P-26 | PVA-8 | 110 | VBTMAC | 57.1 | 563 | 2.5 | 88.8 | 1.5 | 20 | 10 |
| P-27 | PVA-8 | 110 | PSS | 55.6 | 557 | 2.5 | 88.8 | 1.5 | 20 | 10 |

AA: acrylic acid;
VBTMAC: vinylbenzyl trimethylammonium chloride;
MAPTAC: 3-(methacrylamido)propyl trimethylammonium chloride;
PSS: p-styrenesulfonic acid sodium salt; and
AMPS: 2-acrylamido-2-methylpropanesulfonic acid

Examples 1-1 to 1-4

Among the samples P-1 to P-23 obtained in the above Examples, the samples P-1, P-16, P-18 and P-19 each having a polymerizable unsaturated monomer content of 10% by mole were evaluated for water resistance and flex resistance in the manner described above. The results are shown in Table 3.

Comparative Example 1-1

The sample P-24 obtained in the Comparative Example was evaluated for water resistance and flex resistance in the manner described above. The results are shown in Table 3.

Comparative Example 1-2

The sample P-25 obtained in the Comparative Example was tried to dissolve in water in order to evaluate for water resistance and flex resistance in the manner described above. However, since the sample contained gelled-like material, the evaluation was stopped.

TABLE 3

| | Copolymer | | Physical Property | |
|---|---|---|---|---|
| | | Water soluble monomer | Water resistance | Flex resistance |
| | Sample No. | Type | Content mol % | Elution rate mass % | (1) |
| Example 1-1 | P-1 | AA | 10 | 8.5 | A |
| Example 1-2 | P-16 | PSS | 10 | 6.8 | A |
| Example 1-3 | P-18 | AA | 10 | 9.1 | A |
| Example 1-4 | P-19 | AA | 10 | 5.8 | A |
| Comparative Example 1-1 | P-24 | AA | 10 | 25.3 | C |
| Comparative Example 1-2 | P-25 | AA | 7 | — | — |

AA: acrylic acid
PSS: p-styrenesulfonic acid sodium salt

As shown in Table 3, the vinyl alcohol graft copolymers according to the present invention have high water resistance and are excellent in flex resistance. Comparative Example 1-1 produced using the PVA without mercapto group, which is a mixture of the PVA and the homopolymer, is deteriorated in both water resistance and flex resistance. In Comparative Example 1-2, since the graft copolymer was synthesized by using the PVA on which mercapto groups were introduced by the silane coupling agent, in spite that the water soluble unsaturated monomers were used, gelled-like material was produced to fail to obtain a water-soluble graft copolymer.

Example 2-1

Preparation of Ion-Exchange Membrane

Into a conical flask (200 mL), were charged 50 g of an aqueous solution of cationic polymer P-3 and deionized water to prepare a solution having a solid content of 15%. The aqueous solution was casted with an applicator on a polyethylene terephthalate film, and dried for 30 minutes at 80° C. Thus obtained film was heat-treated for 30 minutes at 170° C. to form physical crosslinks. Thereafter the crosslinked film was immersed in an aqueous electrolyte solution of 2 mol/L sodium sulfate for 24 hours. After adding concentrated sulfuric acid into the aqueous electrolyte solution until the solution had a pH 1, the film was immersed in a glutaraldehyde aqueous solution (0.05% by volume), and crosslinking treatment was carried out at 25° C. with stirring for 24 hours. Herein, as the glutaraldehyde aqueous solution, was used a water-diluted solution of "glutaraldehyde" (25% by volume) produced by Ishizu Chemicals Co., Ltd. After the crosslinking treatment, the membrane was immersed in deionized water (25° C.). With exchanging the deionized water several times, the membrane was immersed therein until reaching to swelling equilibrium so as to obtain an ion-exchange membrane.

(Evaluation of Ion-Exchange Membrane)

The ion-exchange membrane produced in this manner was cut into a desired size to obtain a measurement sample. With thus obtained sample, measurements were carried out for thickness, ion exchange capacity, dynamic transport number, membrane resistance, flex resistance and swelling degree. Table 4 shows the obtained results.

Examples 2-2 to 2-11

Except for using each of the P-4 to P-6; P-9 to P-11; and P-20 to P-23 instead of the cationic polymer P-3, ion-exchange membranes were produced in the same manner as Example 2-1, and evaluated. Table 4 shows the obtained results.

Comparative Examples 2-1 to 2-2

Except for using each of the P-26 to P-27, instead of the cationic polymer P-3, ion-exchange membranes were produced in the same manner as Example 2-1, and evaluated. Table 4 shows the obtained results.

TABLE 4

| | Copolymer | | Membrane property | | | | | |
|---|---|---|---|---|---|---|---|---|
| | Sample no. | Ionic monomer content mol % | Membrane thickness μm | Ion exchange capacity mmol/g | Dynamic transport number — | Membrane resistance Ωcm² | Flex resistance (2) | Degree of swelling Times |
| Example 2-1 | P-3 | 10 | 70 | 1.3 | 0.96 | 3.4 | A | 1.46 |
| Example 2-2 | P-4 | 14 | 70 | 1.8 | 0.95 | 2.5 | A | 1.49 |
| Example 2-3 | P-5 | 2 | 70 | 0.3 | 0.88 | 11.5 | 7 | 1.15 |
| Example 2-4 | P-6 | 35 | 70 | 4.5 | 0.90 | 1.2 | 5 | 1.65 |
| Example 2-5 | P-9 | 5 | 70 | 0.7 | 0.96 | 7.0 | A | 1.23 |
| Example 2-6 | P-10 | 10 | 70 | 1.3 | 0.98 | 5.8 | A | 1.42 |
| Example 2-7 | P-11 | 20 | 70 | 2.6 | 0.96 | 1.6 | A | 1.58 |
| Example 2-8 | P-20 | 10 | 70 | 1.3 | 0.99 | 2.7 | A | 1.40 |

TABLE 4-continued

| | Copolymer | | Membrane property | | | | | |
|---|---|---|---|---|---|---|---|---|
| | Sample no. | Ionic monomer content mol % | Membrane thickness μm | Ion exchange capacity mmol/g | Dynamic transport number — | Membrane resistance $\Omega cm^2$ | Flex resistance (2) | Degree of swelling Times |
| Example 2-9 | P-21 | 25 | 70 | 3.3 | 0.95 | 0.9 | A | 1.60 |
| Example 2-10 | P-22 | 7 | 70 | 0.9 | 0.97 | 6.5 | A | 1.30 |
| Example 2-11 | P-23 | 10 | 70 | 1.3 | 0.99 | 5.5 | A | 1.37 |
| Comparative Example 2-1 | P-26 | 10 | 70 | 1.3 | 0.95 | 3.8 | 2 | 1.70 |
| Comparative Example 2-2 | P-27 | 10 | 70 | 1.3 | 0.93 | 6.3 | 3 | 1.73 |

As shown in Table 4, the ion-exchange membranes of the present invention have excellent flex resistance and reduced swelling degree. As shown in Comparative Examples 2-1 to 2-2, the ion-exchange membranes obtained in P-26 to P-27, which were synthesized using a terminal mercapto group-containing vinyl alcohol polymer, have poor flex resistance and large swelling degree.

INDUSTRIAL APPLICABILITY

The vinyl alcohol graft copolymer according to the present invention can be used in applications similar to those in the conventional vinyl alcohol polymers. For example, the vinyl alcohol graft copolymer can be used as a paper coating agent, a modifying agent for paper such as an internal additive for paper and a pigment binder; adhesives for wood, paper, aluminum foil, and inorganic material, a nonwoven fabric binder, a paint, a warp sizing agent, a fiber processing agent, a sizing agent for hydrophobic fibers, such as polyesters, and other various films, sheets, bottles, fibers, thickeners, flocculants, soil modifiers, ion exchange resins, and ion-exchange membranes similar to applications in the conventional vinyl alcohol polymers.

The ion-exchange membrane according to the present invention can be used in various applications such as electrodialysis. Such an ion-exchange membrane is suitably used for desalting of organic matter (food and pharmaceutical raw materials), concentration of salt, desalting of molasses, desalination of seawater or brackish water, desalination and others.

Preferred embodiments according to the present invention are shown and described. It is to be understood that various changes, modifications and omissions may be made without departing from the spirit according to the present invention and are encompassed in the scope of the claims.

Accordingly, such addition, modification and deletions are to be construed as included in the scope of the present invention.

DESCRIPTION OF REFERENCE NUMERALS

1: power
2: ampere meter
3: coulomb meter
4: voltmeter
5: motor
6: stirrer
7: cathode electrode
8: anode electrode
9: cell
10: ion-exchange membrane
11: water bath
12: electrode
13: cell
14: ion-exchange membrane
15: LCR meter

What is claimed is:

1. A vinyl alcohol graft copolymer, comprising
a side-chain mercapto group-containing vinyl alcohol polymer backbone with polymerizable unsaturated monomers as a graft chain,
wherein
the graft chain is attached to the polymer backbone at a mercapto group, and
the side-chain mercapto group-containing vinyl alcohol polymer backbone comprises:
a vinyl alcohol structural unit and
a structural unit represented by formula (I):

where
$R^1$ is a hydrogen atom or a carboxyl group;
$R^2$ is a hydrogen atom, a methyl group, a carboxyl group, or a carboxymethyl group; and
X is a linear or branched divalent $C_{1-22}$ aliphatic hydrocarbon group which optionally contains a nitrogen atom and/or an oxygen atom;
with the proviso that
when $R^1$ is a carboxyl group, the carboxyl group optionally forms a ring with a hydroxyl group of an adjacent vinyl alcohol unit; and
when $R^2$ is a carboxyl group or a carboxymethyl group, the carboxyl group or the carboxymethyl group optionally forms a ring with a hydroxyl group of an adjacent vinyl alcohol unit.

2. The vinyl alcohol graft copolymer as claimed in claim 1, wherein X optionally contains at least one species selected from the group consisting of a carbonyl bond (—CO—), an ether bond (—O—), an amino bond (—NR—) where R is a hydrogen atom or a group containing a carbon atom bonding to the nitrogen atom, an amide bond (—CONH—), an alkoxy group, a carboxyl group (—COOH), and a hydroxyl group (—OH).

3. The vinyl alcohol graft copolymer as claimed in claim 1, wherein X is represented by a formula *—CO—NH—$X^1$—, where * is a bond attached to a main chain of the polymer and $X^1$ is a divalent $C_{1-20}$ aliphatic hydrocarbon group which optionally contains a nitrogen atom and/or an oxygen atom.

4. The vinyl alcohol graft copolymer as claimed in claim 1, wherein the polymerizable unsaturated monomer to be grafted is soluble to water.

5. The vinyl alcohol graft copolymer as claimed in claim 1, wherein the polymerizable unsaturated monomer units have a content of 1 to 90% by mole based on a total structural units of the graft copolymer.

6. The vinyl alcohol graft copolymer as claimed in claim 1, comprising: a cationic monomer unit or an anionic monomer unit as structural units constituting the graft chains of the graft copolymer.

7. A method for producing the vinyl alcohol graft copolymer as claimed in claim 1, the method comprising:
graft-polymerizing the polymerizable unsaturated monomers to a side-chain mercapto group-containing vinyl alcohol polymer.

8. The method as claimed in claim 7, wherein the side-chain mercapto group-containing vinyl alcohol polymer is obtained by a method comprising:
copolymerizing a vinyl ester monomer with an unsaturated monomer copolymerizable with the vinyl ester monomer and convertible into the structural unit represented by the formula (I) to obtain a copolymer comprising a vinyl ester unit and a unit derived from the unsaturated monomer, and
converting the unit derived from the unsaturated monomer into the structural unit represented by the formula (I) by solvolysis.

9. An ion-exchange membrane, comprising: the vinyl alcohol graft copolymer as claimed in claim 6.

10. The ion-exchange membrane as claimed in claim 9, wherein a content of the anionic monomer or the cationic monomer is 1 to 90% by mole based on a total structural units of the vinyl alcohol graft copolymer.

11. The ion-exchange membrane as claimed in claim 9, which has a swelling degree represented by the following formula of 1.68 or less:

Swelling degree=$[W_1]/[W_2]$ where $W_1$ represents a mass of a membrane reached to swelling equilibrium in ion-exchanged water at 25° C. and $W_2$ represents a mass of the membrane after drying the membrane used for measuring $W_1$ at 40° C. for 12 hours under vacuum.

12. The ion-exchange membrane as claimed in claim 9, which has an ion-exchange capacity of 0.30 mmol/g or higher.

13. The ion-exchange membrane as claimed in claim 9, wherein a cross-linking is introduced into the vinyl alcohol graft copolymer.

14. The ion-exchange membrane as claimed in claim 9, which is formed of a single layer containing the vinyl alcohol graft copolymer.

15. The ion-exchange membrane as claimed in claim 14, wherein the single layer has a thickness of from 30 to 1,000 μm.

* * * * *